(12) United States Patent
Imoto et al.

(10) Patent No.: US 10,171,847 B2
(45) Date of Patent: Jan. 1, 2019

(54) INFORMATION DEVICE AND DISTRIBUTION DEVICE

(71) Applicant: Funai Electric Co., Ltd., Daito, Osaka (JP)

(72) Inventors: Yoshinobu Imoto, Osaka (JP); Yoshikazu Fujita, Osaka (JP); Eiji Nakata, Osaka (JP); Ryuji Ikeda, Osaka (JP); Masahito Teraoka, Osaka (JP); Kanji Imanishi, Osaka (JP); Makoto Takemoto, Osaka (JP); Makoto Imagawa, Hyogo (JP); Shinichi Toge, Osaka (JP); Masatoshi Miyoshi, Osaka (JP)

(73) Assignee: FUNAI ELECTRIC CO., LTD., Osaka (JP)

(*) Notice: Subject to any disclaimer, the term of this patent is extended or adjusted under 35 U.S.C. 154(b) by 0 days.

(21) Appl. No.: 15/256,198

(22) Filed: Sep. 2, 2016

(65) Prior Publication Data
US 2017/0070755 A1    Mar. 9, 2017

(30) Foreign Application Priority Data

Sep. 8, 2015 (JP) ................. 2015-176936
Jan. 12, 2016 (JP) ................. 2016-003909

(51) Int. Cl.
*H04N 21/2343* (2011.01)
*H04N 21/432* (2011.01)
(Continued)

(52) U.S. Cl.
CPC ....... *H04N 21/2343* (2013.01); *G11B 27/031* (2013.01); *H04L 65/4092* (2013.01);
(Continued)

(58) Field of Classification Search
None
See application file for complete search history.

(56) References Cited

U.S. PATENT DOCUMENTS 6,757,332 B1* 6/2004 Kadono ........... H04N 21/23412
375/240.25
8,782,285 B1   7/2014 Cassidy et al.
(Continued)

FOREIGN PATENT DOCUMENTS

JP    11-242640 A    9/1999
JP    2008-515334 A    5/2008
(Continued)

OTHER PUBLICATIONS

Extended European Search Report of the corresponding European Application No. 16 18 7488.8, dated Feb. 27, 2017.
(Continued)

*Primary Examiner* — Fernando Alcon
(74) *Attorney, Agent, or Firm* — Global IP Counselors, LLP

(57) ABSTRACT

An information device is provided that includes a communication component and a controller. The communication component communicates with an external device. The controller downloads video data from the external device through the communication component. The controller performs processing for playing the video data. The controller executes an application for playing the downloaded video data. The controller sends a download request for each divided video data, with the divided video data being obtained by dividing up the video data.

13 Claims, 19 Drawing Sheets

(51) Int. Cl.
  *H04L 29/06* (2006.01)
  *H04L 29/08* (2006.01)
  *G11B 27/031* (2006.01)
  *H04N 21/262* (2011.01)
  *H04N 21/845* (2011.01)
  *H04N 21/854* (2011.01)
  *H04N 21/2387* (2011.01)
  *H04N 21/4402* (2011.01)
  *H04N 21/4425* (2011.01)

(52) U.S. Cl.
  CPC ............ *H04L 65/601* (2013.01); *H04L 67/06* (2013.01); *H04N 21/2387* (2013.01); *H04N 21/234309* (2013.01); *H04N 21/26258* (2013.01); *H04N 21/26275* (2013.01); *H04N 21/4325* (2013.01); *H04N 21/4402* (2013.01); *H04N 21/4425* (2013.01); *H04N 21/8456* (2013.01); *H04N 21/85406* (2013.01)

(56) References Cited

U.S. PATENT DOCUMENTS

| | | | |
|---|---|---|---|
| 2007/0230920 A1* | 10/2007 | Gasper | H04N 21/4126 386/334 |
| 2008/0168516 A1 | 7/2008 | Flick et al. | |
| 2009/0183215 A1* | 7/2009 | McCartie | H04N 21/235 725/105 |
| 2009/0282159 A1* | 11/2009 | Wang | H04L 61/609 709/231 |
| 2011/0299586 A1 | 12/2011 | Odlund et al. | |
| 2013/0036479 A1* | 2/2013 | Tsuji | H04N 5/76 726/29 |
| 2013/0067509 A1* | 3/2013 | Talbert | H04N 21/43615 725/31 |
| 2014/0164482 A1 | 6/2014 | Losev et al. | |
| 2014/0280781 A1* | 9/2014 | Gregotski | H04L 65/60 709/219 |
| 2015/0058907 A1* | 2/2015 | Picconi | H04L 67/104 725/116 |
| 2017/0272700 A1* | 9/2017 | Kahn | H04N 7/162 |

FOREIGN PATENT DOCUMENTS

| | | |
|---|---|---|
| JP | 2013-005239 A | 1/2013 |
| WO | 2013-123360 A1 | 8/2013 |

OTHER PUBLICATIONS

Partial European Search Report of the corresponding European Application No. 16187488.8, dated Feb. 1, 2017.
Pantos R et al., "HTTP Live Streaming; draft-pantos-http-live-streaming-16.text.", pp. 1-48, Apr. 15, 2015, Geneva, Switzerland.

\* cited by examiner (SECOND EMBODIMENT)

SEEK PLAYBACK TABLE

| PLAYBACK TIME (SECONDS) | DATA VOLUME (BYTES) |
|---|---|
| 0 | 0 |
| 1 | 288000 |
| ... | ... |
| xx | xxxxxxx |
| yy | yyyyyyy |
| ... | ... |
| zz | zzzzzzz |

ONE-SECOND INTERVAL

FIRST SET OF DIVIDED VIDEO DATA

SECOND SET OF DIVIDED VIDEO DATA

FIG. 9

(SEVENTH EMBODIMENT)

DOWNLOAD REQUEST

GET /dms/contents/FU_0001001E_0000010200_0000010900030200049e00_SRO.m2ts
Host: 192.168.1.19:55247
Range: bytes=0-
Use: Download

INFORMATION DEVICE AND DISTRIBUTION DEVICE

CROSS-REFERENCE TO RELATED APPLICATIONS

This application claims priority to Japanese Patent Application Nos. 2015-176936 filed on Sep. 8, 2015 and 2016-003909 filed on Jan. 12, 2016. The entire disclosures of Japanese Patent Application Nos. 2015-176936 and 2016-003909 are hereby incorporated herein by reference.

BACKGROUND

Field of the Invention

The present invention generally relates to an information device and a distribution device.

Background Information

Information devices that communicate with a distribution device are well-known in the art (see Japanese Unexamined Patent Application Publication (Translation of PCT Application) NO. 2008-515334 (Patent Literature 1), for example).

Patent Literature 1 discloses a mobile communication terminal (information device) and a content server (distribution device). The mobile communication terminal communicates with the content server. The content server distributes video or other such data. This mobile communication terminal is configured to download video and other data from the content server.

In general, with an information device such as the mobile communication terminal discussed in Patent Literature 1, an OS (operating system) and a plurality of application programs (hereinafter referred to simply as "application") are installed as software for managing the overall system.

SUMMARY

With an information device such as the mobile communication terminal discussed in Patent Literature 1 above, depending on the specifications of the OS that is installed, there are situations in which restrictions related to the downloading of data are provided. For instance, if an error such as an interruption of download occurs during the download while the application is running in the background, then the data that has been downloaded so far may be discarded by the OS. If this happens, then a problem is that the downloaded data cannot be used by the information device even though the data has been partially downloaded.

Another problem is that even if the data that has been partially downloaded is not discarded by the OS, the downloaded data cannot be used in the following situations. Specifically, with a distribution device such as the content server discussed in Patent Literature 1, when video data is distributed, there will be situations in which converted data is generated by converting the format of the video data and the converted data whose generation is complete is sequentially distributed. In this case, the converted data that has already been distributed is sequentially deleted at the distribution device. When the distribution of the converted data is interrupted in the distribution device such as this, the information device that communicates with the distribution device tries to resume the download of the converted data from the byte location at which distribution is interrupted (the interruption location). However, since the converted data is deleted at the distribution device, it is impossible to designate the interruption location of the converted data and resume the download. This necessitates redoing the download of the converted data from the beginning. Accordingly, even though the data is partially downloaded at the information device, the problem is that the downloaded data cannot be used.

One object is to provide an information device and a distribution device with which downloaded video data can be used even when the download of video data has been interrupted.

In view of the state of the known technology and in accordance with a first aspect of the present invention, an information device is provided that comprises a communication component and a controller. The communication component communicates with an external device. The controller downloads video data from the external device through the communication component. The controller performs processing for playing the video data. The controller executes an application for playing the downloaded video data. The controller sends a download request for each divided video data, with the divided video data being obtained by dividing up the video data.

BRIEF DESCRIPTION OF THE DRAWINGS

Referring now to the attached drawings which form a part of this original disclosure:

FIG. 9 is a diagram illustrating a seek playback table produced by the information device pertaining to a second embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Configuration of Distribution System

First, the configuration of a distribution system 100 pertaining to the first embodiment will be described through reference to FIG. 1.

Figure 1:
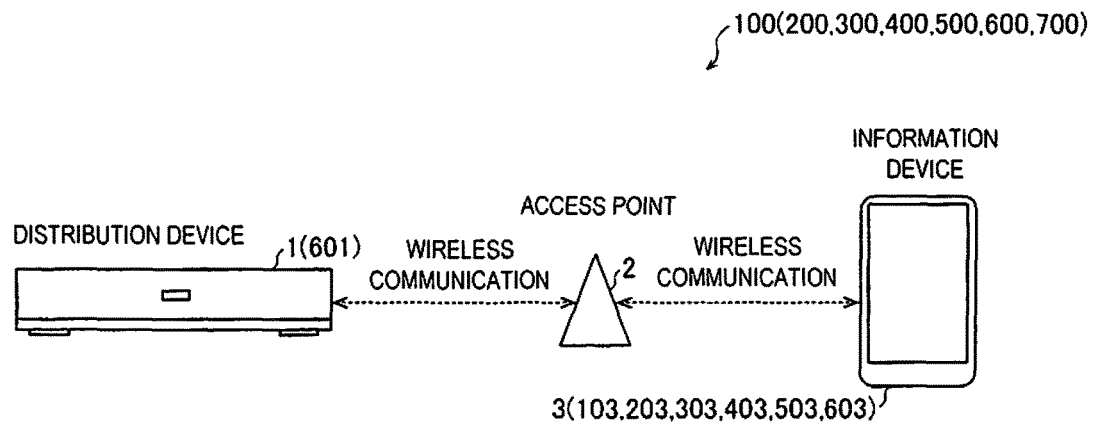
FIG. 1 is a diagram of a distribution system pertaining to first to seventh embodiments.

As shown in FIG. 1, the distribution system 100 pertaining to the first embodiment comprises a distribution device 1, an access point 2, and an information device 3. With the distribution system 100, the distribution device 1 and the information device 3 communicate wirelessly with each other via the access point 2. In the illustrated embodiment, the distribution device 1 and the information device 3 are separate devices. Thus, the distribution device 1 is formed as an external device relative to the information device 3, while the information device 3 is formed as an external device relative to the distribution device 1, for example.

The distribution device 1 is a device that is configured to distribute video data. More specifically, the distribution device 1 is a video recording device that is configured to record digital television broadcasts, and to distribute recorded broadcast programs and broadcast programs that are being viewed, as the video data.

The information device 3 is a device that is configured to download the video data. More specifically, the information device 3 is a smart phone, a tablet PC, or another such portable information device. The information device 3 is configured to download the video data from the distribution device 1. The information device 3 is also configured to play the downloaded video data.

With the distribution system 100, communication between the distribution device 1 and the information device 3 can be performed, for example, based on DLNA (Digital Living Network Alliance®) technology.

Configuration of Information Device

Figure 2:
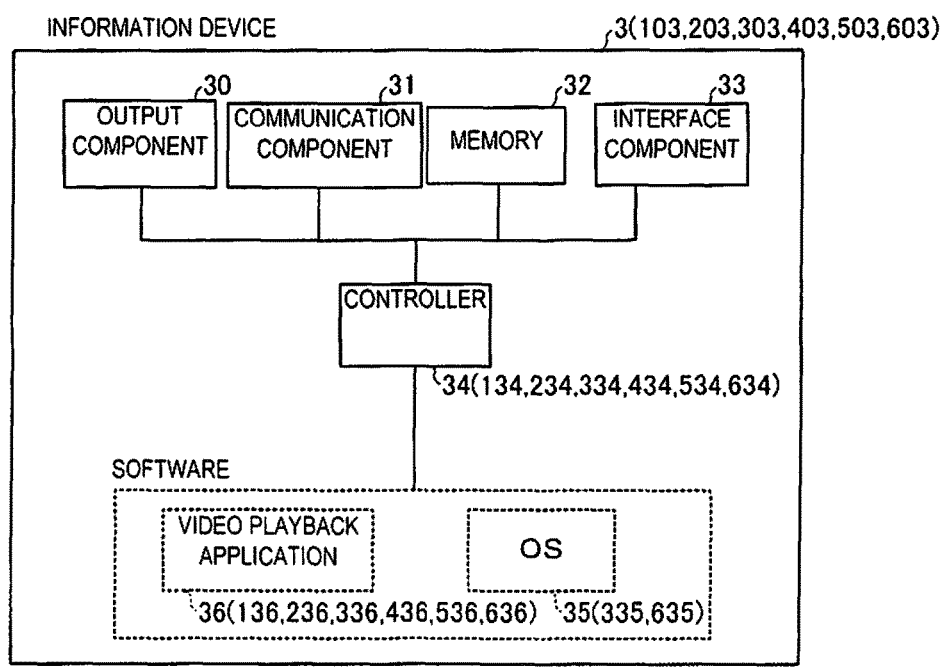
FIG. 2 is a block diagram of the overall configuration of an information device pertaining to the first to seventh embodiments.

As shown in FIG. 2, the information device 3 comprises an output component 30, a communication component 31, a memory 32, an interface component 33, and a controller 34. Also, an OS (operating system) 35 and a video playback application program (hereinafter referred to simply as a "video playback application" or "application") 36 are installed in the information device 3. The video playback application 36 is an example of the "application" of the present disclosure.

The output component 30 includes a display component for outputting image data of the video data, and an audio output component for outputting the audio data of the video data. The output component 30 is configured to output images and audio when the video data is played.

The communication component 31 is configured to communicate wirelessly based on a specific standard (such as the IEEE 802.11 standard, for example). The communication component 31 is also configured to communicate wirelessly with the distribution device 1 via the access point 2. The communication component 31 is formed by a conventional communication device or circuit well known in the art. Thus, detailed description of the communication component 31 will be omitted.

The memory 32 is configured to store data. For example, the downloaded video data and the programs, such as the OS 35, the application 36, and the like, are stored in the memory 32. The memory 32 can include a conventional memory, which is well known in the art, as needed and/or desired. For example, the memory 32 can include a ROM (Read Only Memory) device or flash memory and a RAM (Random Access Memory) device. The RAM can store statuses of operational flags and various data, such as detection results. The ROM can store control programs for various operations of the controller 34.

The interface component 33 includes one or more interface buttons, a touch panel, or the like. The interface component 33 is configured to receive user input (or input). Thus, the information device 3 is configured to perform operations in response to the user input.

The controller 34 is configured to control the overall operation of the information device 3. The controller 34 is also configured to execute the OS 35, the video playback application 36, and other such programs. The controller 34 includes a CPU (central processing unit), or other processers (microcomputers). The controller 34 can also include other conventional components such as an input interface circuit, an output interface circuit, and storage devices such as an internal ROM device and an internal RAM device. The controller 34 is programmed to control the various component of the information device 3. It will be apparent to those skilled in the art from this disclosure that the precise structure and algorithms for controller 34 can be any combination of hardware and software that will carry out the functions of the present invention.

Figure 3:
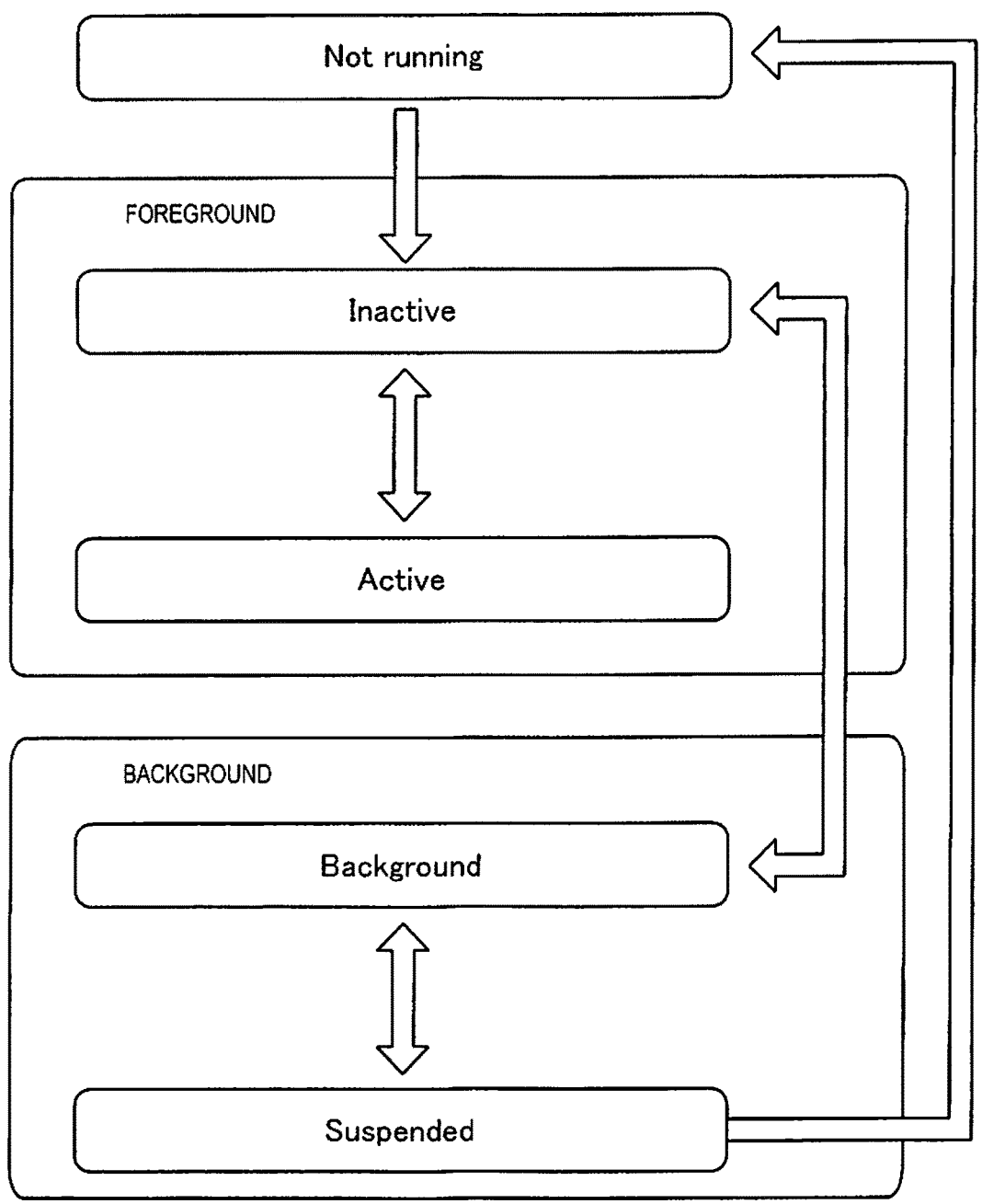
FIG. 3 is a diagram illustrating the application lifecycle of the information device pertaining to the first embodiment.

The OS 35 is a program that manages the overall system within the information device 3. This OS 35 is configured to change the state of the video playback application 36 or other application according to the application lifecycle shown in FIG. 3.

"Not running" is a state in which the application is not running, or was being executed but has now ended.

"Inactive" is a state in which the application is running in the foreground, but is not executing any processing. The term "foreground" means a state in which an interface screen is displayed on the display component of the output component 30, and the application is being used. The OS 35 changes the application from "not running" to "inactive" when the interface component 33 is used to run the application, for example.

"Active" means a state in which the application is running in the foreground, and is executing processing. The OS 35 changes the application between "inactive" and "active."

"Background" means a state in which the application is running in the background, and is executing processing. Background also means a state in which no interface screen is displayed on the display component of the output component 30, and the application is not being used. The OS 35 changes the application between "inactive" and "background."

"Suspended" means a state in which the application is running in the background, but is not executing any processing. The OS 35 changes the application between "background" and "suspended." Also, the OS 35 changes the application from "suspended" to "not running."

The OS 35 is also configured to change the application from "suspended" to "background" after the download of the video data or other data has been completed while the application is running in the background ("suspended"). Consequently, the application can perform post-download processing on the downloaded data.

Also, the OS 35 is configured to discard (delete) data that has been only partially downloaded when a communication error occurs between the information device 3 and the distribution device 1, or when a download interruption error, such as a halting of the video data distribution of the distribution device 1, occurs. Therefore, even if the data is partially downloaded, this partial data will be discarded (deleted) by the OS 35.

The video playback application 36 is an application for playing the video data. More specifically, the video playback application 36 is configured to download the video data from the distribution device 1 via the communication component 31. The video playback application 36 is configured to play the downloaded video data. As mentioned above, the video playback application 36 is executed by the controller 34. Thus, although the controller 34 and the video playback application 36 are illustrated as separate parts in FIG. 2, the processing of the controller 34 and the video playback application 36 can be performed in the same hardware, such as the CPU or processor. Thus, in the following disclosure, the processing performed by the video playback application 36 is also performed by the controller 34.

Figure 4:
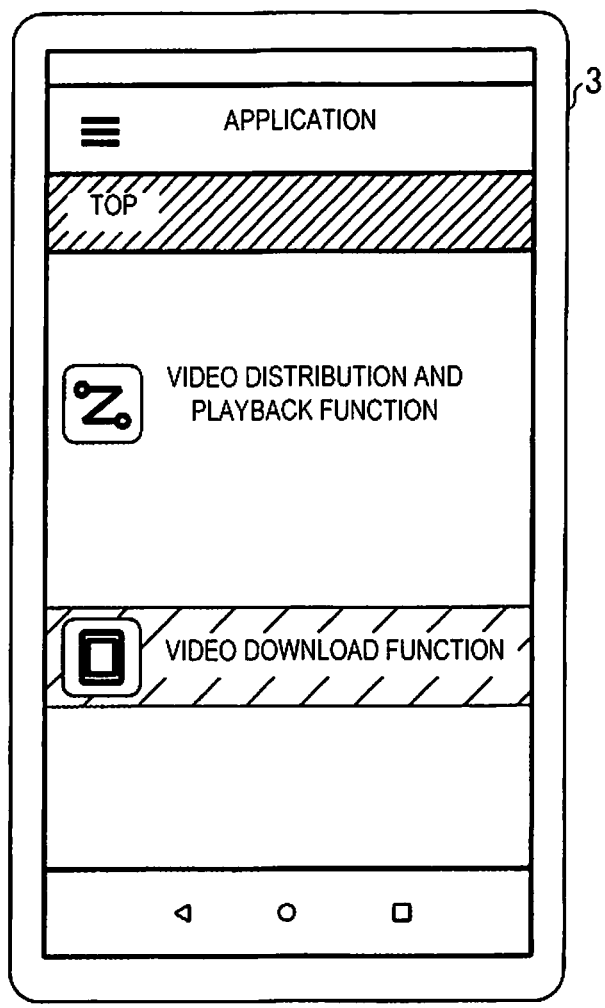
FIG. 4 is a diagram illustrating the function of a video playback application provided to the information device pertaining to the first embodiment.

As shown in FIG. 4, the video playback application 36 is an application having a video distribution and playback function and a video download function.

The video distribution and playback function of the video playback application 36 is a function of successively playing the video data while downloading the video data from the distribution device 1 (i.e., streaming function).

The video download function of the video playback application 36 is a function of downloading the video data from the distribution device 1, and then playing the downloaded video data. The user can watch the video data by selecting either the video distribution and playback function or the video download function, as needed and/or desired. In the first embodiment, the description will focus on when the video download function is used.

Figure 5:
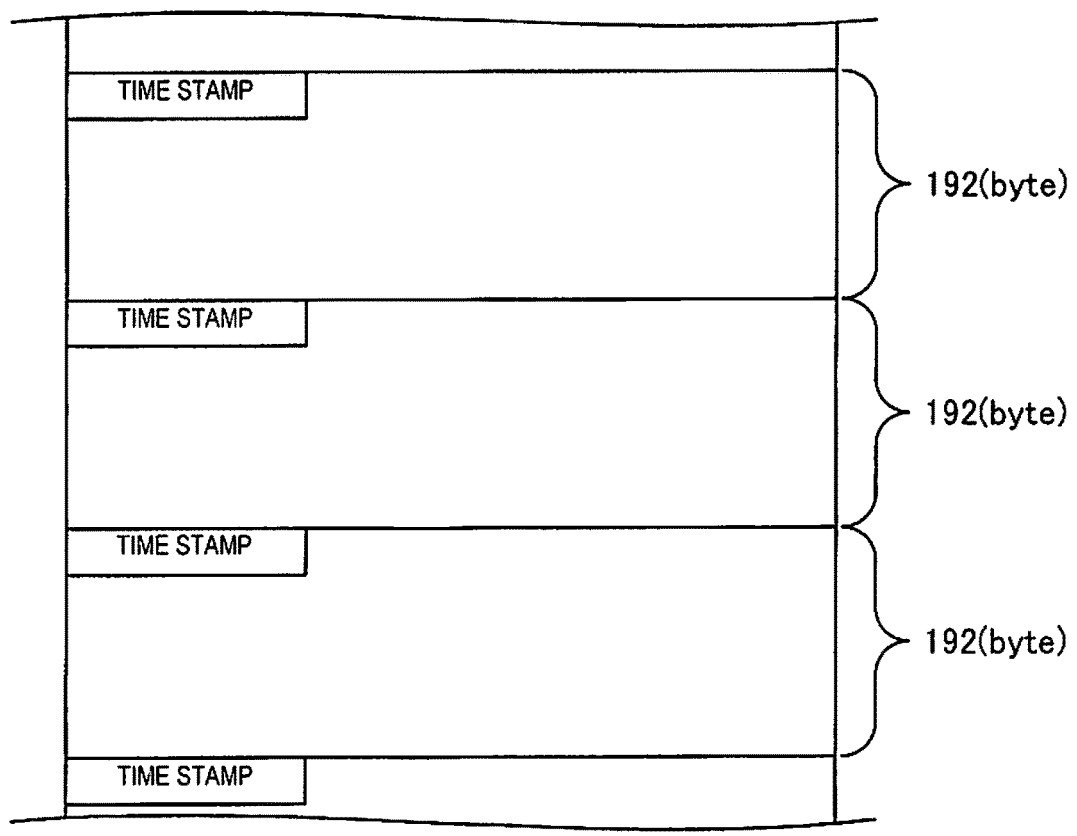
FIG. 5 is a diagram illustrating TS files (video data) downloaded by the information device pertaining to the first embodiment.

As shown in FIG. 5, the video playback application 36 is configured to download video data (TS (transport stream) files) stored in MPEG2-TS (transport stream) format in the distribution device 1.

Figure 6:
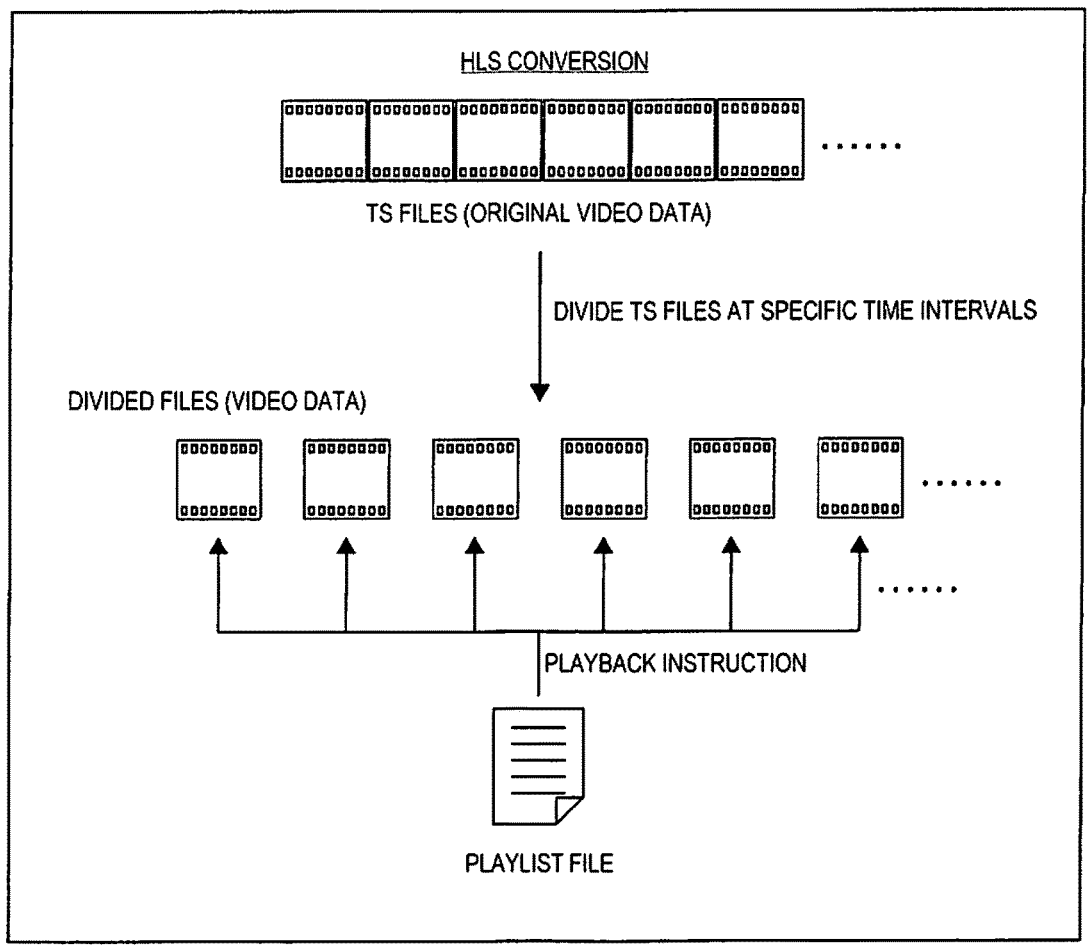
FIG. 6 is a diagram illustrating HLS conversion processing of the TS files.

As shown in FIG. 6, the video playback application 36 is configured to convert the downloaded video data into HLS (HTTP live streaming) format that is playable in the information device 3.

More specifically, the video playback application 36 is configured to convert the video data into the HLS format by producing a plurality of divided files and a playlist file based on the downloaded video data. The divided files are produced by dividing the downloaded video data at specific time intervals (such as intervals of 10 seconds). The playlist file is provided for a playback instruction of the divided files. For example, the playback file includes playback order of the divided files and references (e.g., URLs (uniform resource locators)) indicating storage locations of the divided files.

As shown in FIG. 5, time stamps are affixed to the video data (TS files) at every 192 bytes. The video playback application 36 is configured to analyze the time stamps of the downloaded video data, and to produce the plurality of the divided files and the playlist file based on the analyzed time stamps.

The video playback application 36 is also configured to play video data that has been converted into the HLS format (the plurality of the divided files and the playlist file). More specifically, the video playback application 36 is configured to play the video data that has been converted into the HLS format by designating the divided files to be played, based on the playlist file.

Configuration of Controller of Information Device Pertaining to Video Data Download In the first embodiment, the controller 34 (the video playback application 36) is configured to send a download request for each of a plurality of sets of divided video data, in order to download the video data while the video playback application 36 is running in the background. The divided video data is obtained by dividing up the video data into a plurality of segments.

Figure 7:
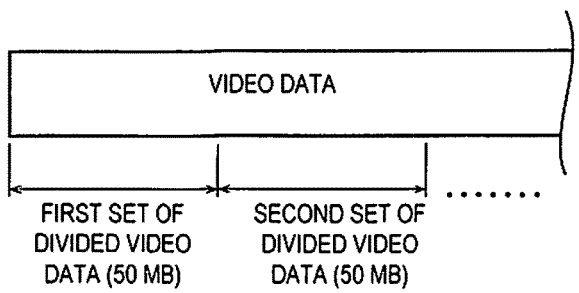
FIG. 7 is a diagram illustrating processing to download divided video data by the information device pertaining to the first embodiment.

More specifically, as shown in FIG. 7, the controller 34 is configured to send the download request for each set of the divided video data by sending a download request to the distribution device 1 by designating a byte range of the video data. In particular, the controller 34 sends the download request for a set of the divided video data by designating a byte range of the video data corresponding to the set of the divided video data.

For example, in the illustrated embodiment, part of the video data with a data amount of 50 MB (megabytes) is requested as one set of the divided video data. Specifically, the controller 34 first sends the distribution device 1 a download request for a first set of the divided video data by designating a byte range of up to 50 MB from the beginning of the video data. Then, the video data in the byte range of up to 50 MB from the beginning of the video data is downloaded as the first set of divided video data. Then, the controller 34 sends the distribution device 1 another download request by designating a byte range of the next 50 MB of the video data (from 50 MB to 100 MB). Then, the video data in the byte range of the next 50 MB of the video data (from 50 MB to 100 MB) is downloaded as the second set of divided video data.

The controller 34 is configured to repeatedly send the download request for the divided video data until the download of all of the video data is complete.

Also, in the first embodiment, the controller 34 is configured to perform processing to convert the format of the video data (the downloaded divided video data) into the HLS format that is playable in the information device 3

(hereinafter referred to as "HLS conversion processing") every time the divided video data is downloaded.

More specifically, when the first set of the divided video data is downloaded, the controller 34 is configured to produce a plurality of divided files and a playlist file based on the first set of the divided video data that has been downloaded. Furthermore, when the second set of the divided video data is downloaded, the controller 34 is further configured to produce a plurality of divided files based on the second set of the divided video data that has been downloaded, and to update the playlist file produced based on the first set of divided video data. Specifically, the controller 34 updates the playlist file by adding a playlist portion based on the second set of the divided video data).

The controller 34 is configured to then repeat the production of divided files based on the downloaded divided video data and the updating of the playlist file until the download of all of the video data (the download of the end of the video data) is complete.

Also, the controller 34 is configured to continue the download of the video data (divided video data) in the foreground if the video playback application 36 is moved to the foreground during the download of the video data while the video playback application 36 is running in the background. Here, the controller 34 is configured to continue the download of the video data (divided video data) in the foreground while playing the downloaded divided video data that has been converted to the HLS format.

Video Division Download Processing

The video division download processing performed in the first embodiment will now be described through reference to the sequence diagram in FIG. 8. In the video division download processing, the operation of the OS 35 and the video playback application 36 is executed by the controller 34. Here, an example in which 50 MB of data is requested as one set of the divided video data will be described in the illustrated embodiment. However, the data amount requested as one set of the divided video data is not limited to 50 MB, and can be different data amount.

Figure 8:
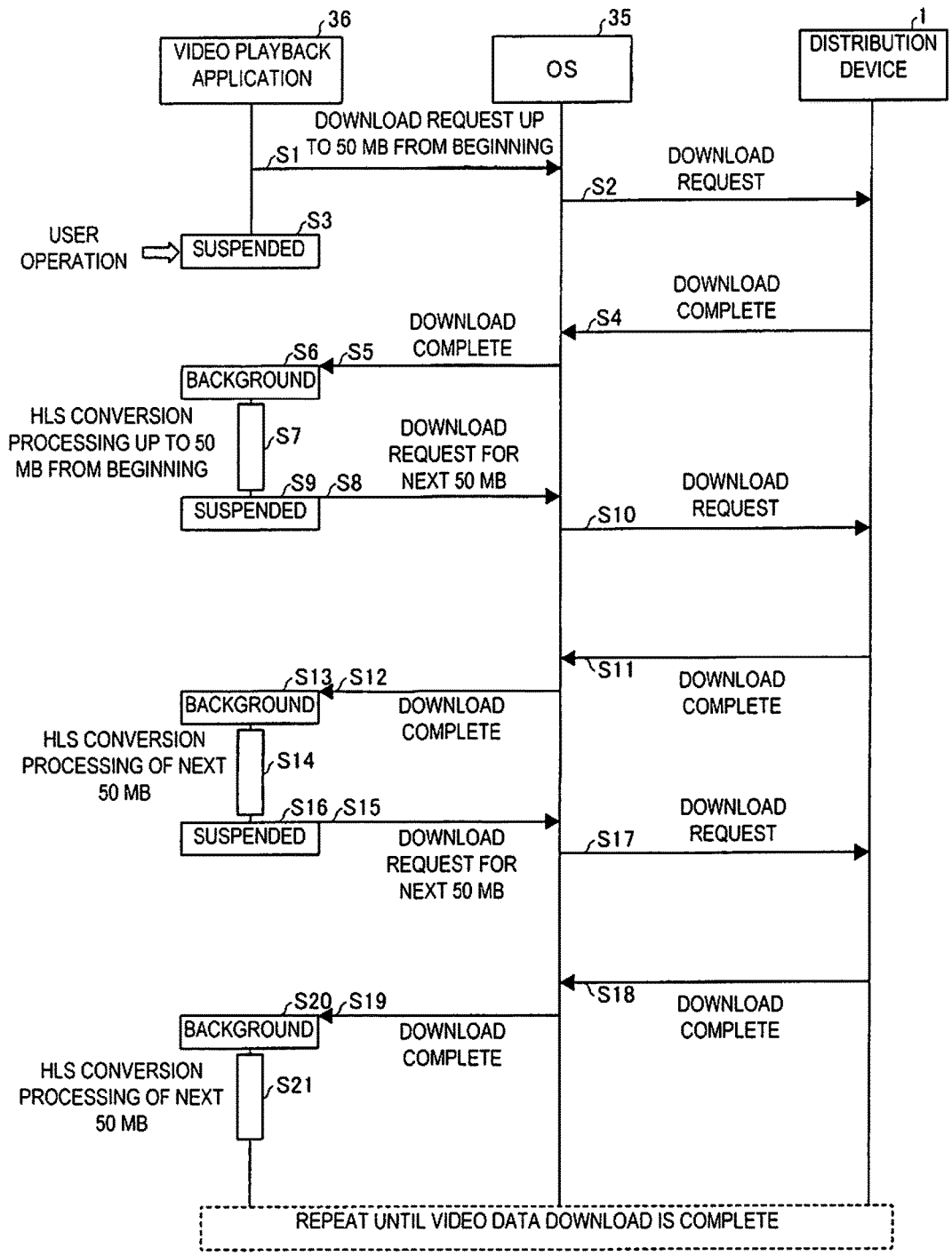
FIG. 8 is a sequence diagram illustrating video division download processing by the information device pertaining to the first embodiment.

As shown in FIG. 8, in step S1, a download request is sent from the video playback application 36 to the OS 35 by designating a byte range of 50 MB from the beginning of the video data (TS files) (i.e., from 0 MB to 50 MB).

Then, in step S2, the download request is sent from the OS 35 to the distribution device 1 by designating the byte range of 50 MB from the beginning of the video data. As a result, 50 MB of the video data (the first set of the divided video data) from the beginning of the video data is downloaded from the distribution device 1.

Then, in step S3, the user operates the interface component 33 to move the video playback application 36 to "suspended." That is, in step S3, the OS 35 moves the video playback application from the foreground to the background.

After this, in step S4, the distribution device 1 notifies the OS 35 that the download is complete.

Then, in step S5, the OS 35 notifies the video playback application 36 that the download is complete.

Then, in step S6, the OS 35 moves the video playback application 36 from "suspended" to "background."

Then, in step S7, the HLS conversion processing is performed to convert the downloaded video data of 50 MB from the beginning (the first set of the divided video data) into the HLS format. That is, a plurality of divided files and a playlist file are produced based on the downloaded first set of the divided video data (TS files).

Once the HLS conversion processing of the first set of the divided video data is complete, in step S8, the video playback application 36 sends the OS 35 another download request by designating a byte range of the next 50 MB of the video data (i.e., from 50 MB to 100 MB).

Then, in step S9, the OS 35 moves the video playback application 36 from "background" to "suspended."

Then, in step S10, the OS 35 sends the distribution device 1 the download request by designating the byte range of the next 50 MB of the video data. As a result, the next 50 MB of the video data (the second set of divided video data) is downloaded from the distribution device 1.

After this, in step S11, the distribution device 1 notifies the OS 35 that the download is complete.

Then, in step S12, the OS 35 notifies the video playback application 36 that the download is complete.

Then, in step S13, the OS 35 moves the video playback application 36 from "suspended" to "background."

Then, in step S14, the next 50 MB of the video data that has been downloaded (the second set of divided video data) is converted by the HLS conversion processing into the HLS format. Here, a plurality of divided files are produced based on the downloaded second set of the divided video data (TS files), and the playlist file produced based on the first set of the divided video data is updated.

Once the HLS conversion processing of the second set of the divided video data is complete, in step S15, yet another download request is sent from the video playback application 36 to the OS 35 by designating a byte range of the next 50 MB of the video data (i.e., from 100 MB to 150 MB).

Then, in step S16, the OS 35 moves the video playback application 36 from "background" to "suspended."

Then, in step S17, the OS 35 sends the distribution device 1 the download request by designating the byte range of the next 50 MB of the video data. As a result, the next 50 MB of the video data (the third set of the divided video data) is downloaded from the distribution device 1.

After this, in step S18, the distribution device 1 notifies the OS 35 that the download is complete.

Then, in step S19, the OS 35 notifies the video playback application 36 that the download is complete.

Then, in step S20, the OS 35 moves the video playback application 36 from "suspended" to "background."

Then, in step S21, the next 50 MB of data that is downloaded (the third set of divided video data) is converted by the HLS conversion processing to the HLS format. Here, a plurality of divided files are produced based on the downloaded third set of the divided video data (TS files), and the playlist file that has been produced based on the first set of the divided video data and updated based on the second set of the divided video data is updated.

After this, the processing that is the same as the processing of steps S15 to S21 is repeated until the download of all of the video data is complete.

Effect of First Embodiment

The following effect is obtained with the first embodiment.

As discussed above, in the first embodiment, the controller 34 is provided to send the download request for each set of the divided video data while the video playback application 36 is running in the background. The divided video data is obtained by dividing up the video data into a plurality of segments or sets. Consequently, the download of the video data can be complete for each set of the divided video data. In other words, the download of the video data can be complete every time the divided video data is downloaded. Thus, the divided video data that has already been downloaded can be recognized by the OS 35 as one set of data. As a result, when the OS 35 is configured to discard any video data that has been downloaded part way, even if the download of the video data is interrupted, the downloaded divided video data will not be discarded by the OS 35. Thus, the downloaded video data (divided video data) can be used without being discarded. Also, the controller 34 is configured to perform the processing (the HLS conversion processing) for playing the video data on the plurality of sets of the divided video data that have been downloaded in response to the download request. This allows the downloaded divided video data to be made in a playable state. As a result of these, even if the download of the video data should be interrupted, the video data (divided video data) that has already been downloaded can be made in the playable state. Specifically, even if an error occurs that interrupts the download, such as a communication error between the information device 3 and the distribution device 1 or a stoppage of the distribution of the video data by the distribution device 1, or even if the user has intentionally interrupted (halted) the download, the video data (divided video data) that has already been downloaded can be made in the playable state.

Also, in the first embodiment, as discussed above, the processing for playing the video data is the processing to convert the format of the video data to the playable format, such as the HLS format. This allows the video data (divided video data) that has already been downloaded to be played quickly.

Also, in the first embodiment, as discussed above, the controller 34 is configured to perform the processing to convert the format of the video data to the playable HLS format every time one of the sets of the divided video data is downloaded. Consequently, the processing to convert the format of the video data to the playable HLS format can be carried out at different timings for each of the plurality of sets of the divided video data. Thus, the processing load on the controller 34 can be spread out.

Also, in the first embodiment, the information device 3 comprises the controller 34. The controller 34 downloads the video data from the distribution device 1 through the communication component 31. The controller 34 executes the video playback application 36 that plays the downloaded video data. The controller 34 sends the download request for each set of the divided video data while the video playback application 36 is running in the background. The divided video data is obtained by dividing up the video data into the plurality of sets or segments. The controller 34 performs the processing for playing the video data on the divided video data that is downloaded in response to the download request.

Second Embodiment

A second embodiment will now be described through reference to FIGS. 1, 2, 5, 9, and 10. In this second embodiment, unlike in the first embodiment above, processing is performed to produce a seek playback table every time divided video data is downloaded.

Configuration of Distribution System

As shown in FIG. 1, a distribution system 200 pertaining to the second embodiment differs from the distribution system 100 in the first embodiment in that it comprises an information device 103. As shown in FIG. 2, the information device 103 differs from the information device 3 in the first embodiment in that it comprises a controller 134 and a video playback application 136. Those components that are the same as in the first embodiment will be numbered the same and will not be described again. The video playback application 136 is an example of the "application" of the present disclosure.

Configuration of Controller of Information Device Pertaining to Video Data Download The second embodiment, unlike in the first embodiment, HLS conversion processing is not performed every time the divided video data is downloaded. In the second embodiment, the controller 134 (video playback application 136) of the information device 103 is configured to perform processing to link or merge downloaded divided video data together, without performing the HLS conversion processing, every time the divided video data is downloaded.

The controller 134 is also configured to repeat the processing to merge the downloaded divided video data together until the download of all of the video data is complete.

As shown in FIG. 9, in the second embodiment, the controller 134 is configured to perform processing to produce a seek playback table for seek playback (hereinafter referred to as "seek playback table production processing") every time divided video data is downloaded. In the seek playback, the playback location in the video data is designated for playback. The seek playback table is an example of the "playback data" of the present disclosure.

More specifically, when the first set of the divided video data has been downloaded, the controller 134 is configured to produce the seek playback table based on the downloaded first set of the divided video data. Here, the download of the divided video data can be performed in the same manner as described in the first embodiment. Furthermore, when the second set of the divided video data has been downloaded, the controller 134 is configured to update the seek playback table that has been produced based on the first set of the divided video data based on the downloaded second set of the divided video data. For example, the controller 134 updates the seek playback table by adding the table portion based on the second set of the divided video data.

The controller 134 is also configured to repeat this updating of the seek playback table based on the downloaded divided video data until the download of all of the video data is complete.

Here, the seek playback table contains data for the seek playback that plays the video data by designating a desired playback location in the video data. Specifically, the seek playback table contains data in which the playback time (in seconds) of the video data is associated with the data volume (in bytes) of the video data. In the illustrated embodiment, as shown in FIG. 9, the seek playback table has data in which the playback time (in seconds) of the video data is associated with the data volume (in bytes) of the video data in one-second time intervals.

Also, the controller 134 is configured to produce the seek playback table in which the playback time (in seconds) of the video data is associated with the data volume (in bytes) of the video data by analyzing the time stamps of the video data (see FIG. 5) based on bit rate (bytes per second) information for the video data (divided video data).

Configuration of Controller of Information Device Pertaining to Video Data Playback In the second embodiment, as mentioned above, the HLS conversion processing is not performed every time the divided video data is downloaded. On the other hand, in the second embodiment, the downloaded divided video data is merged together, and then the merged video data is converted to the HLS format to perform the playback. Therefore, in the second embodiment, the controller 134 is configured to play the video data (the video data in which the divided video data is merged together) while the video data is converted to the HLS format.

Here, the controller 134 is configured to specify a playback location in the video data based on the seek playback table when the user has designated the playback location by using the interface component 33. More specifically, the controller 134 converts the playback location (playback time) designated by the user with the interface component 33 into the data volume of the video data corresponding to this playback location. Then, the controller 134 specifies the playback location in the video data based on the converted data volume of the video data. Also, the controller 134 is configured to play the video data while converting the video data into the HLS format from the specified playback location when the playback location has been specified.

Video Division Download Processing

The video division download processing pertaining to the second embodiment will now be described through reference to FIG. 10. The Processing that is the same as the video division download processing in the first embodiment will be numbered the same and will not be described again.

Figure 10:
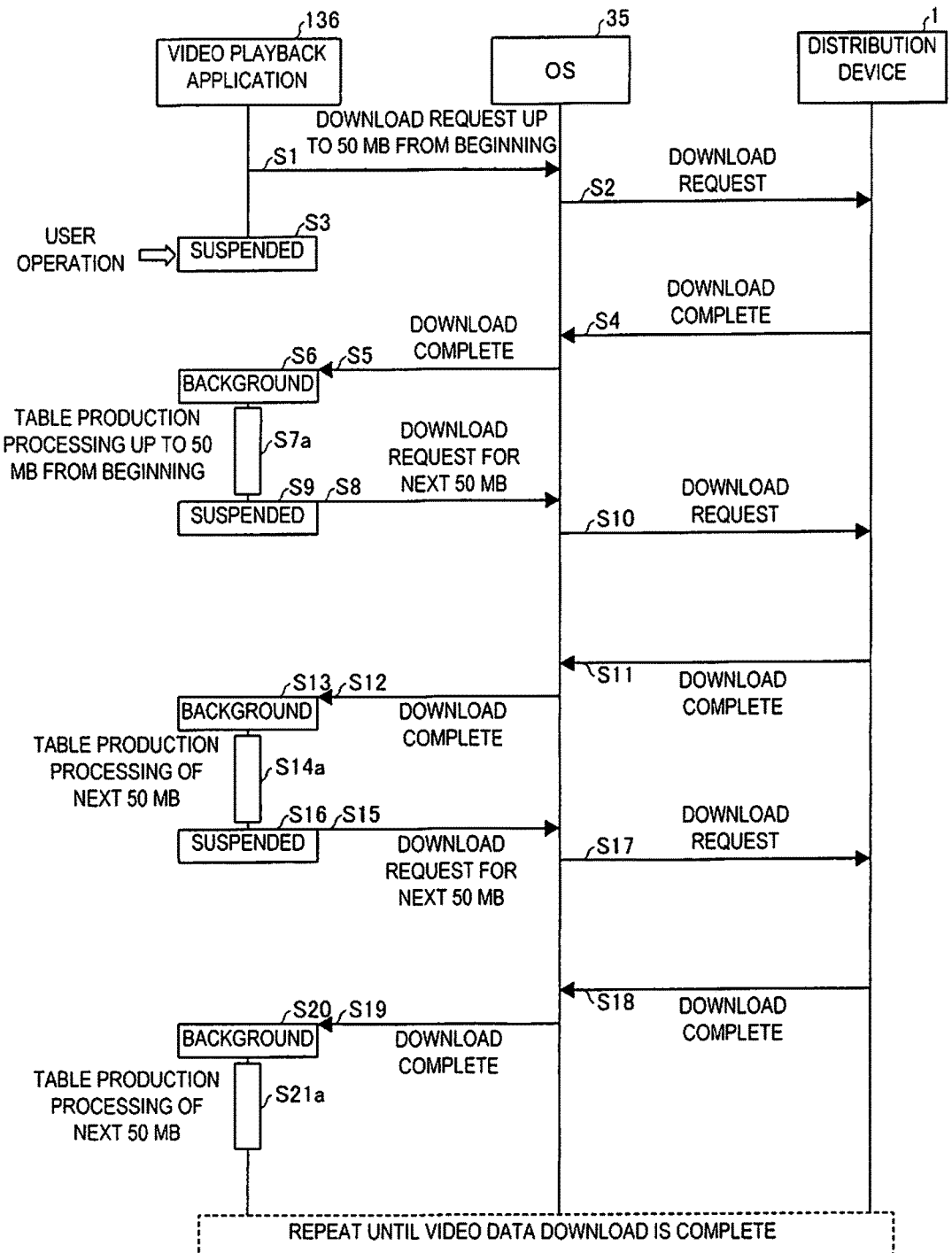
FIG. 10 is a sequence diagram illustrating video division download processing by the information device pertaining to the second embodiment.

As shown in FIG. 10, in steps S1 to S6, the same process as in the first embodiment is performed.

Then, in step S7a, the seek playback table production processing is performed on the downloaded video data (50 MB of the video data from the beginning of the video data) (the first set of the divided video data). That is, the seek playback table in which the playback time (in seconds) of the first set of the divided video data is associated with the data volume (in bytes) of the video data is produced by analyzing the time stamps of the first set of the divided video data, based on bit rate information about the downloaded first set of the divided video data (TS files).

Then, in steps S8 to S13, the same processing as in the first embodiment is performed.

Then, in step S14a, the seek playback table production processing is performed on the next 50 MB of the video data (from 50 MB to 100 MB) (the second set of the divided video data). Here, the seek playback table produced based on the first set of the divided video data (step S7a) is updated based on the downloaded second set of the divided video data (TS files).

Also, in step S14a, the processing is performed to merge the downloaded divided video data together. That is, the processing is performed to merge the first set of the divided video data and the second set of the divided video data.

Then, in steps S15 to S20, the same processing as in the first embodiment is performed.

Then, in step S21a, the seek playback table production processing is performed on the next 50 MB of the video data (from 100 MB to 150 MB) (the third set of the divided video data). Here, the seek playback table that is produced based on the first set of the divided video data (step S7a) and is updated based on the second set of the divided video data (step S14a) is further updated based on the downloaded third set of the divided video data (TS files).

Also, in step S21a, the processing is performed to merge the downloaded divided video data together. That is, the processing is performed to merge the third set of the divided video data to the linked or merged video data produced in step S14a. Specifically, this merged video data produced in step S14a consists of the first set of the divided video data and the second set of the divided video data.

After this, the processing that is the same as the processing of steps S15 to S21a is repeated until the downloaded of all of the video data stored in the distribution device 1 is complete.

The rest of the configuration of the second embodiment is the same as in the first embodiment above.

Effect of Second Embodiment

The following effect is obtained with the second embodiment.

As discussed above, in the second embodiment, the controller 134 is provided to send the download request for each set of the divided video data while the video playback application 136 is running in the background. The divided video data is obtained by dividing up the video data into a plurality of sets or segments. Consequently, the download of the video data can be complete for each set of the divided video data. In other words, the download of the video data can be complete every time the divided video data is downloaded. Thus, the divided video data that has already been downloaded can be recognized by the OS 35 as one set of data. As a result, when the OS 35 is configured to discard any video data that has been downloaded part way, even if the download of the video data is interrupted, the downloaded divided video data will not be discarded by the OS 35. Thus, the downloaded video data (divided video data) can be used without being discarded. Also, the controller 134 is configured to perform the processing (the seek playback table production processing) for playing the video data on the plurality of sets of the divided video data that have been downloaded in response to the download request. This allows the downloaded divided video data to be made in a playable state. As a result of these, even if the download of the video data should be interrupted, the video data (divided video data) that has already been downloaded can be made in the playable state.

Also, in the second embodiment, as discussed above, the processing for playing the video data is the processing to produce the seek playback table in which the playback time of the video data is associated with the data volume of video data. Consequently, the seek playback can be performed even when the playback is performed while converting the format of the video data to the playable format.

Also, in the second embodiment, as discussed above, the controller 134 is configured to perform the processing to produce the seek playback table every time one of the plurality of sets of the divided video data is downloaded. Consequently, the processing to produce the seek playback table can be performed at a different timing for each of the plurality of sets of the divided video data. Thus, the processing load on the controller 134 can be spread out.

The rest of the effect of the second embodiment is the same as in the first embodiment above.

Third Embodiment

A third embodiment will now be described through reference to FIGS. 1, 2, 11, and 12. In this third embodiment, the playback time of the video data is corrected, in addition to the configuration of the second embodiment given above.

Configuration of Distribution System

As shown in FIG. 1, a distribution system 300 pertaining to the third embodiment differs from the distribution system 200 in the second embodiment in that it comprises an information device 203. As shown in FIG. 2, the information device 203 differs from the information device 103 in the second embodiment in that it comprises a controller 234 and a video playback application 236. Those components that are the same as in the second embodiment will be numbered the same and will not be described again. The video playback application 236 is an example of the "application" of the present disclosure.

Configuration of Controller of Information Device Pertaining to Video Data Playback In the third embodiment, the controller 234 (the video playback application 236) is configured to correct the playback time (or playback duration) of the video data to the playback time (or playback duration) of the incomplete video data that has been downloaded by the time the video data download is interrupted. Thus, the playback time of the video data can correspond to the playback time of the incomplete video data. This incomplete video data is only a part of single set of video data (i.e., single title or single content) stored in the distribution device 1. The incomplete video data is made up of the divided video data that has been downloaded by the time the video data download is interrupted.

More specifically, the controller 234 is configured to acquire the playback time of the incomplete video data based on the seek playback table produced based on the sets of the divided video data constituting the incomplete video data. Also, the controller 234 is configured to correct the playback time of the video data (the total playback time) based on the total playback time of the acquired incomplete video data. In other words, the controller 234 change the playback time of the video data from the playback time of the original video data (total playback time of the original video data) to the playback time of the incomplete video data (total playback time of the downloaded divided video data).

This correction will now be described through reference to FIG. 11. The description here will be of a case in which the playback time of the original video data (stored in the distribution device 1) is 4 hours and 4 seconds (04h:00m:04s), and the playback time of the incomplete video data playback time is 19 minutes and 11 seconds (00h:19m:11s). That is, this is a case in which the video data up to 19 minutes and 11 seconds out of the original video data having the playback time of 4 hours and 4 seconds is partially acquired as the incomplete video data. In other words, in this example, when the divided video data having the playback location of 19 minutes and 11 seconds is downloaded, the video data downloaded is interrupted.

Figure 11:
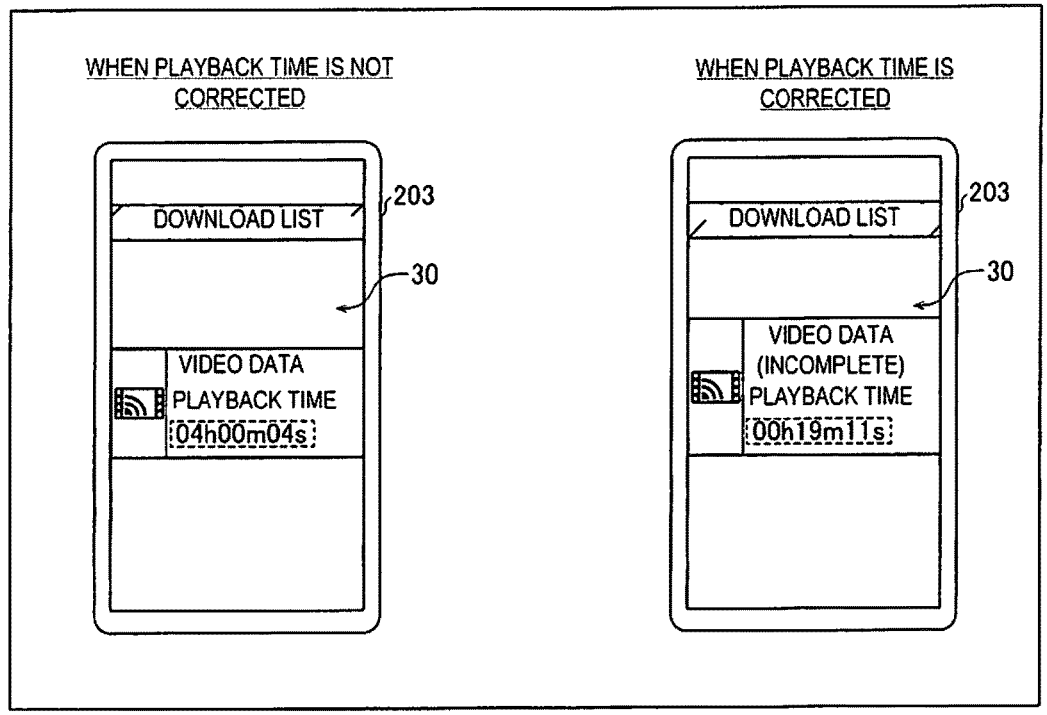
FIG. 11 is a diagram illustrating playback time correction processing of video data in the information device pertaining to a third embodiment.

As shown in FIG. 11, if the playback time correction is not performed, the controller 234 merely displays the playback time of 4 hours and 4 seconds (04h:00m:04s) as the playback time of the video data (the incomplete video data). Specifically, the controller 234 merely displays the playback time of the original video data as the playback time of the incomplete video data on the display component of the output component 30 of the information device 203.

On the other hand, if the playback time correction is performed, the controller 234 displays the playback time of 19 minutes and 11 seconds (00h:19m:11s) as the playback time of the video data (the incomplete video data). Specifically, the controller 234 displays the actual playback time of the incomplete video data as the playback time of the incomplete video data on the display component of the output component 30 of the information device 203. Thus, in the illustrated embodiment, the controller 234 displays the actual playback time (the corrected playback time) on the display component of the output component 30 when the playback time of the video data is corrected. Also, as illustrated in FIG. 11, the controller 234 is configured to mark the video data with an indicator "Incomplete" indicative of the incomplete video data when the playback time of the video data is corrected. Specifically, as illustrated in FIG. 11, the indicator "Incomplete" is added to the title of the video data, and displayed as information indicating that the video data is incomplete video data on the display component of the output component 30 of the information device 203.

Video Division Download Processing

The video division download processing pertaining to the third embodiment will now be described through reference to the sequence diagram in FIG. 12. In this video division download processing, the operation of the OS 35 and the video playback application 236 is executed by the controller 234. Processing that is the same as the video division download processing in the second embodiment above will be numbered the same and not described again.

Figure 12:
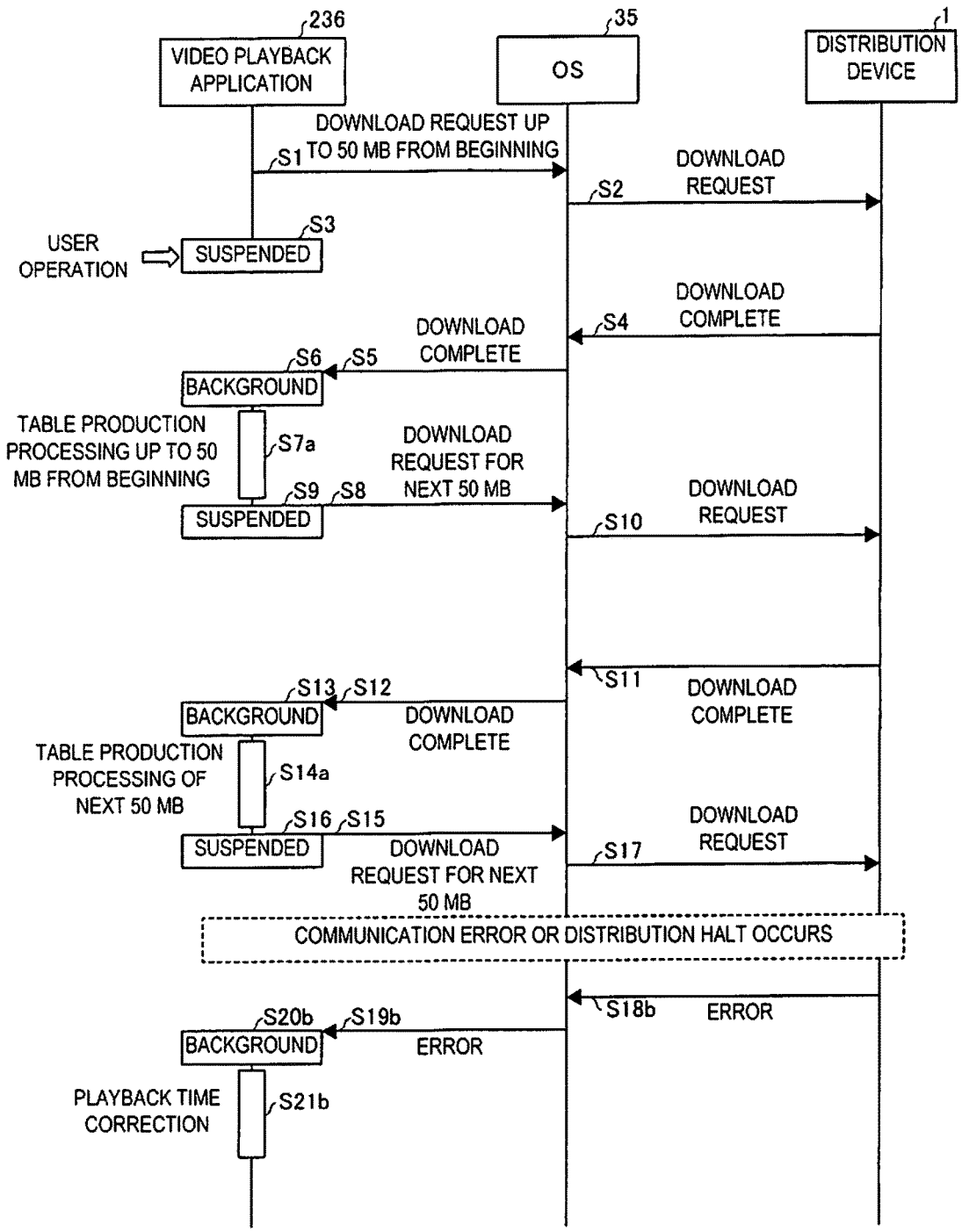
FIG. 12 is a sequence diagram illustrating video division download processing by the information device pertaining to the third embodiment.

As shown in FIG. 12, in steps S1 to S17, the same processing as in the second embodiment is performed.

Then, if an error occurs that interrupts the download, such as a communication error between the information device 203 and the distribution device 1, or a stoppage of the distribution of the video data by the distribution device 1, then in step S18*b*, the distribution device 1 notifies the OS 35 of an error. Of course, alternatively or additionally, this download error can be detected by the OS 35 in a conventional manner.

Then, in step S19*b*, the OS 35 notifies the video playback application 236 of the error.

Then, in step S20*b*, the OS 35 moves the video playback application 236 from "suspended" to "background."

Then, in step S21*b*, the playback time of the incomplete video data is corrected. Specifically, the playback time of the incomplete video data (total playback time) is corrected from the playback time of the original video data (total playback time) to the playback time of the incomplete video data (total playback time). Specifically, the controller 234 determines the total playback time of the downloaded divided video data (incomplete video data) that is downloaded before the error occurs. For example, the controller 234 can determine the total playback time of the downloaded divided video data (incomplete video data) based on the seek playback table. The seek playback table can include the total playback time of the downloaded divided video data (incomplete video data) that has been merged together. Then, the controller 234 correct the total playback time of the video data from the total playback time of the original video data to the total playback time of the downloaded divided video data (incomplete video data). Note that the total playback time of the original video data that is stored in the distribution device 1 can be achieved in a conventional manner. For example, the total playback time of the original video data can be obtained from the distribution device 1 with the title of the video data or other property information before the download request is sent from the information device 203 or in response to the first download request for the video data.

The rest of the configuration of the third embodiment is the same as in the second embodiment above.

Effect of Third Embodiment

The following effect is obtained with the third embodiment.

As discussed above, in the third embodiment, the controller 234 is configured to correct the playback time of the video data to the actual playback time of the incomplete video data that is downloaded by the time the video data download is interrupted. Thus, the displayed playback time of the video data can correspond to the actual playback time of the incomplete video data. Consequently, when the incomplete video data is played, the user can be notified of the actual playback time of the incomplete video data, rather than the playback time of the original video data. As a result, the user can be properly notified of how much of the video data (up to what playback time) has been downloaded as the incomplete video data.

The rest of the effect of the third embodiment is the same as in the second embodiment above.

Fourth Embodiment

A fourth embodiment will now be described through reference to FIGS. 1, 2, 13, and 14. In the fourth embodiment, when resume video data that includes an overlapping data portion that partially overlaps with incomplete video data is downloaded, the resume video data is deleted, in addition to the configuration of the second embodiment above.

Configuration of Distribution System

As shown in FIG. 1, the distribution system 400 pertaining to the fourth embodiment differs from the distribution system 200 in the second embodiment in that it comprises an information device 303. As shown in FIG. 2, the information device 303 differs from the information device 103 in the second embodiment in that it comprises a controller 334, an OS 335 and a video playback application 336. Those components that are the same as in the second embodiment will be numbered the same and will not be described again. The video playback application 336 is an example of the "application" of the present disclosure.

Configuration of OS

In the fourth embodiment, the OS 335 is configured to perform resume download. In the resume download, when the download of the video data is interrupted and then resumed, the download of the video data is resumed from the data location prior to the download interruption. The download interruption occurs by the instantaneous cutoff of wireless communication or other reasons, for example, before the download of all of the video data is complete (during the download of the video data).

Also, when the resume download is performed, the OS 335 is configured to send the download request for the video data of a byte range from a location before the download interruption to the end of the video data. Consequently, the video data with the byte range of from before the instantaneous cutoff of wireless communication to the end can be downloaded.

Figure 13:
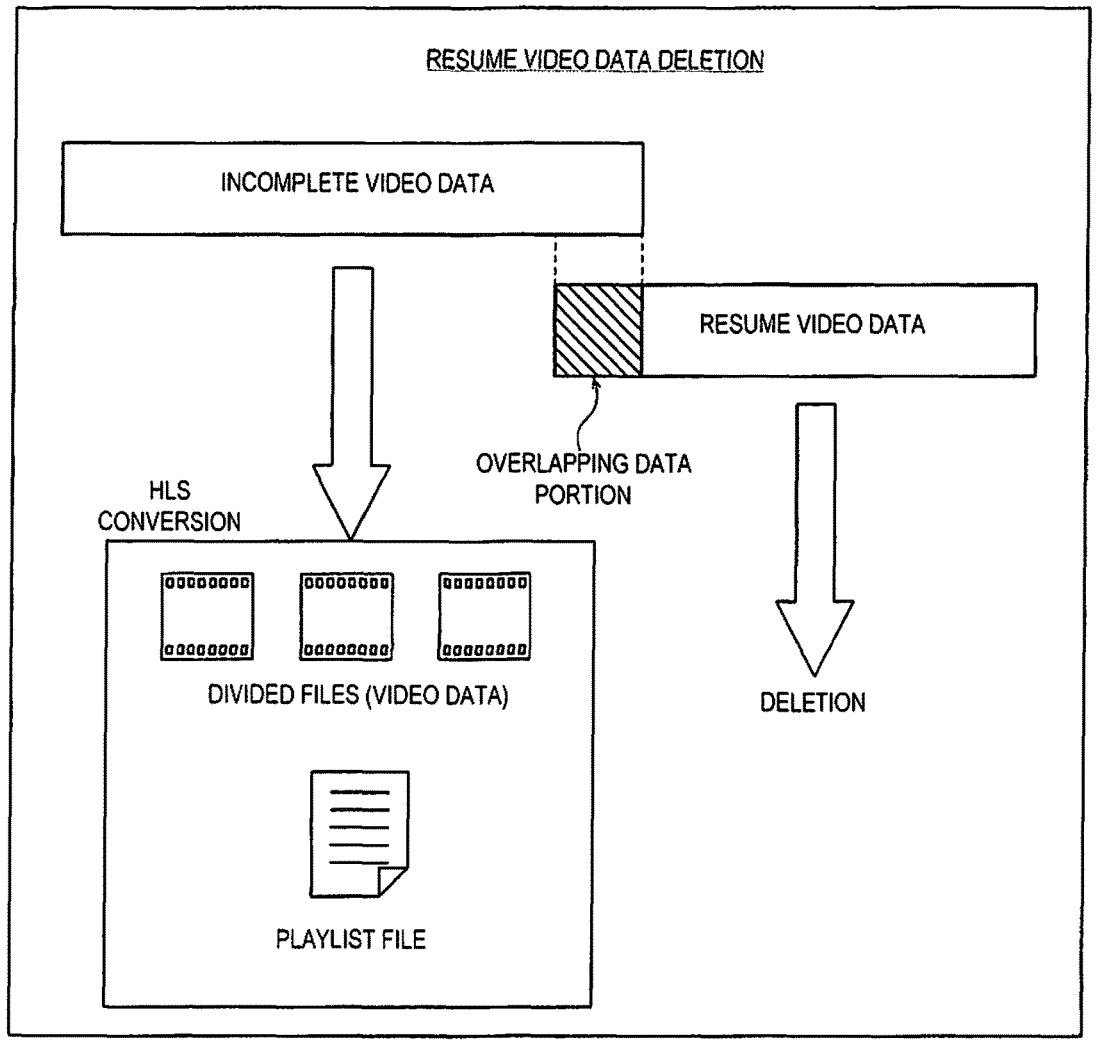
FIG. 13 is a diagram illustrating processing to delete resume video data of the information device pertaining to a fourth embodiment.

As a result, as shown in FIG. 13, when the resume download is performed on the video data, the OS 335 is configured to download the resume video data that includes a data portion (overlapping data portion) that at least partially overlaps with the incomplete video data that has been downloaded by the time the video data download is interrupted. This resume video data is an example of the "overlapping video data" of the present disclosure. Also, the incomplete video data is the video data constituted by the divided video data whose download is complete by the time the video data download is interrupted. For example, the incomplete video data corresponds to a data range of the video data from the beginning of the video data to a data location at which the download is interrupted.

Configuration of Controller of Information Device Pertaining to Video Data Download In the fourth embodiment, the controller 334 (the video playback application 336) is configured to delete all of the downloaded resume video data in response to determining that the resume video data is downloaded by the OS 335.

More specifically, the controller 334 is configured to determine that the downloaded video data is the resume video data when the data amount of the downloaded video data is equal to or greater than a predetermined data amount (e.g., 50 MB) that is requested for one set of the divided video data. In response determining that the downloaded video data is the resume video data, then the controller 334 deletes all of the resume video data. Consequently, the controller 334 is configured to play only the incomplete video data while converting the incomplete video data to the HLS format in the playback of the video data.

The video division download processing pertaining to the fourth embodiment will now be described through reference to the sequence diagram in FIG. 14. In this video division download processing, the operation of the OS 335 and the video playback application 336 is executed by the controller 334. Here, in the illustrated embodiment, a case will be described in which the resume download is performed after 120 MB (megabytes) of the video data is downloaded and the video data download is interrupted by the instantaneous cutoff of wireless communication. Processing that is the same as the video division download processing in the second embodiment will be numbered the same and will not be described again.

Figure 14:
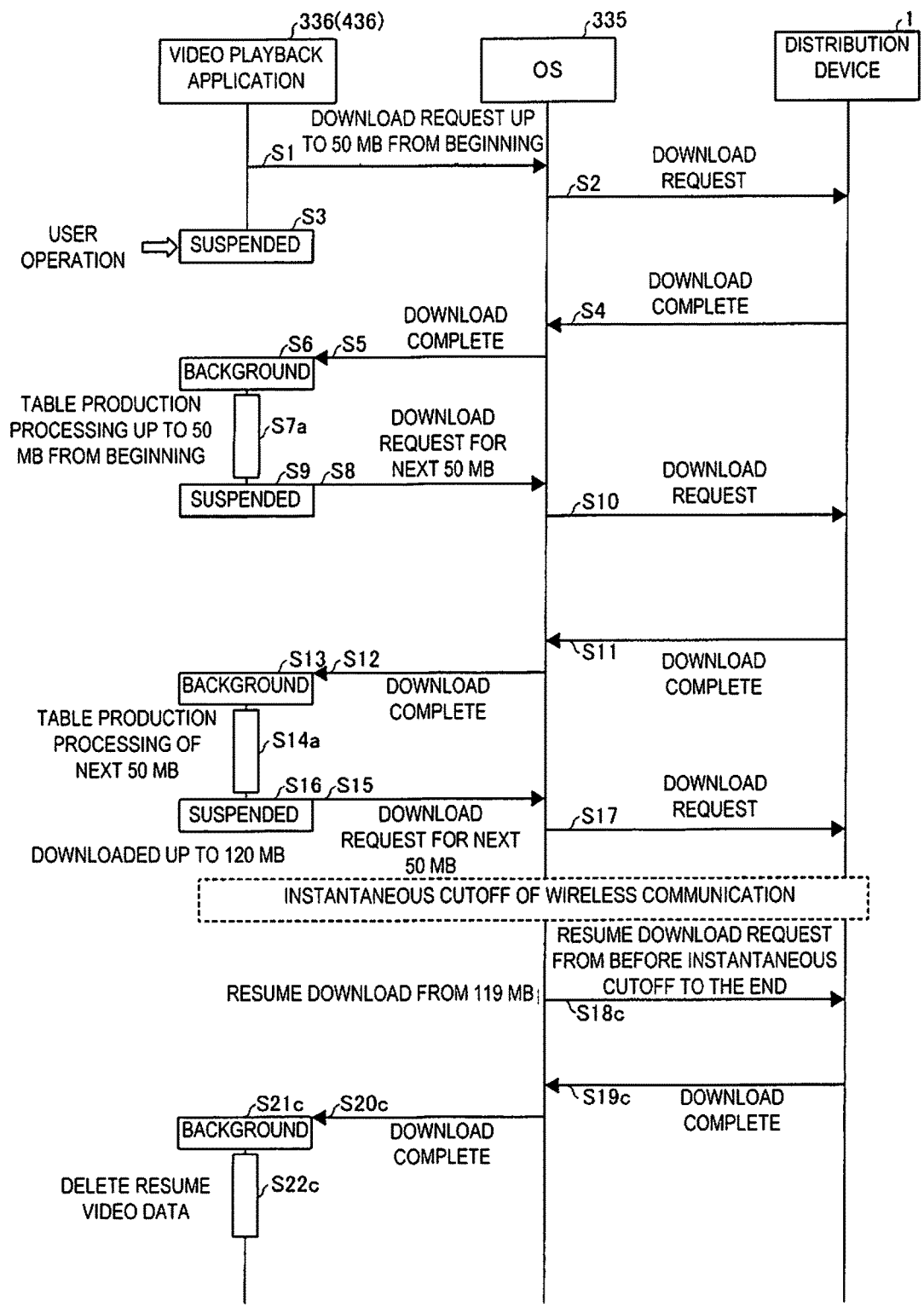
FIG. 14 is a sequence diagram illustrating video division download processing by the information device pertaining to the fourth and fifth embodiments.

As shown in FIG. 14, the same processing as in the second embodiment is performed in steps S1 to S17.

If the OS 35 determines that the download is interrupted by instantaneous cutoff of wireless communication or other reasons and then resumed, then in step S18c, the OS 335 automatically sends the distribution device 1 a download request (resume download request) to resume the download of the video data. Specifically, the OS 335 sends the download request for the resume video data by designating the byte range of the video data from before the download interruption (before the instantaneous cutoff of wireless communication) to the end of the video data. For example, when the video data has been downloaded up to 120 MB from the beginning of the video data before the instantaneous cutoff of wireless communication, then the OS 335 sends the download request for a byte range of the video data from 119 MB to the end (such as 1 GB, for example). Consequently, the video data is downloaded that includes an overlapping data portion from 119 MB to 120 MB of the incomplete video data. In this example, the origin (119 MB) of the byte range that is requested by the download request is set to 1 MB before the end (120 MB) of the video data that has been downloaded by the time the download is interrupted. However, the origin of the byte range can be set differently by the OS 335 as needed and/or desired.

Then, in step S19c, the distribution device 1 notifies the OS 335 that the download is complete.

Then, in step S20c, the OS 335 notifies the video playback application 336 that the download is complete.

Then, in step S21c, the OS 335 moves the video playback application 336 from "suspended" to "background."

Then, in step S22c, the controller 334 (the video playback application 336) determines if the downloaded video data is the resume video data. If it is determined that the downloaded video data is the resume video data, then all of the resume video data is deleted.

The rest of the configuration of the fourth embodiment is the same as in the second embodiment above.

Effect of Fourth Embodiment

The following effect is obtained with the fourth embodiment.

As discussed above, in the fourth embodiment, the controller 334 is configured to delete all of the resume video data (overlapping video data) when the download of the video data is resumed and the resume video data is downloaded that includes the overlapping data portion that at least partially overlaps with the incomplete video data that has been downloaded by the time the download of the video data is interrupted. Consequently, when the video data is played, the occurrence of malfunction due to the overlapping data portion in which the incomplete video data and the resume video data overlap can be reliably prevented.

The rest of the effect of the fourth embodiment is the same as in the second embodiment above.

Fifth Embodiment

A fifth embodiment will now be described through reference to FIGS. 1, 2, 14, and 15. In this fifth embodiment, when resume video data (overlapping video data) is downloaded that includes an overlapping data portion that at least partially overlaps with incomplete video data, only the overlapping data portion is deleted, unlike in the fourth embodiment above.

Configuration of Distribution System

As shown in FIG. 1, the distribution system 500 pertaining to the fifth embodiment differs from the distribution system 400 in the fourth embodiment in that it comprises an information device 403. As shown in FIG. 2, the information device 403 differs from the information device 303 in the fourth embodiment in that it comprises a controller 434 and a video playback application 436. Those components that are the same as in the fourth embodiment will be numbered the same and will not be described again. The video playback application 436 is an example of the "application" of the present disclosure.

Figure 15:
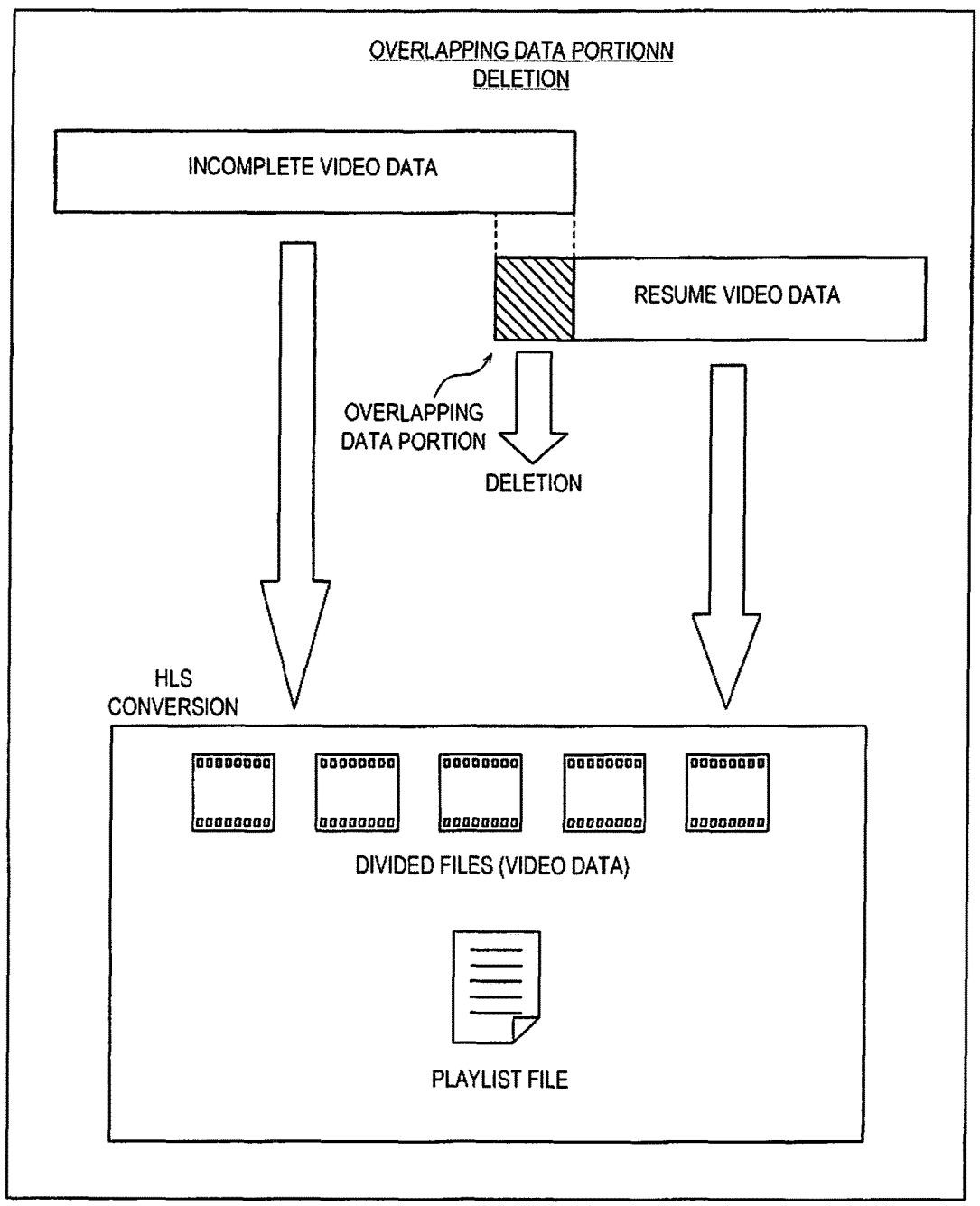
FIG. 15 is a diagram illustrating processing to delete an overlapping data portion of resume video data in the information device pertaining to the fifth embodiment.

Configuration of Controller of Information Device Pertaining to Video Data Download As shown in FIG. 15, in the fifth embodiment, the controller 434 (video playback application 436) is configured to delete only an overlapping data portion of the resume video data when the resume video data is downloaded by the OS 335. The overlapping data portion is a data portion of the resume video data that at least partially overlaps with the incomplete video data.

Also, the controller 434 is configured to play the video data while converting both the incomplete video data and the resume video data from which the overlapping data portion has been deleted to the HLS format in the playback of the video data.

Specifically, in the fifth embodiment, in step S22c shown in FIG. 14, rather than deleting all of the resume video data, only the overlapping data portion of the resume video data is deleted. The resume video data from which the overlapping data portion has been deleted is then stored in the memory 32 in a state of not being linked or merged to the incomplete video data that is downloaded before the resume video data.

The rest of the configuration of the fifth embodiment is the same as in the fourth embodiment above.

Effect of Fifth Embodiment

The following effect is obtained with the fifth embodiment.

As discussed above, in the fifth embodiment, the controller 434 is configured to delete only the overlapping data portion of the resume video data from the resume video data when the download of the video data is resumed and the resume video data is downloaded that includes the overlapping data portion that at least partially overlaps with the incomplete video data that is downloaded by the time the video data download is interrupted. Consequently, the occurrence of malfunction due to the overlapping data portion in which the incomplete video data and the resume video data overlap can be reliably prevented when the video data is played. Also, this allows a data portion of the resume video data other than the overlapping data portion to be made in a playable state.

The rest of the effect of the fifth embodiment is the same as in the fourth embodiment above.

Sixth Embodiment

A sixth embodiment will now be described through reference to FIGS. 1, 2, 4, 10, and 16. In this sixth embodiment, video division download processing is performed on the video data after a designated playback location, in addition to the configuration of the second embodiment above.

Configuration of Distribution System

As shown in FIG. 1, the distribution system 600 pertaining to the sixth embodiment differs from the distribution system 200 in the second embodiment in that it comprises an information device 503. As shown in FIG. 2, the information device 503 differs from the information device 103 in the second embodiment in that it comprises a controller 534 and a video playback application 536. Those components that are the same as in the second embodiment will be numbered the same and will not be described again. The video playback application 536 is an example of the "application" of the present disclosure.

Configuration of Controller of Information Device Pertaining to Video Data Download In the sixth embodiment, the controller 534 (video playback application 536) is configured to download divided video data corresponding to the video data for a period after the designated playback location. The divided video data is obtained by dividing up the original video data into a plurality of segments or sets. The controller 534 is further configured to perform the seek playback table production processing on the plurality of sets of the divided video data that are downloaded.

Figure 16:
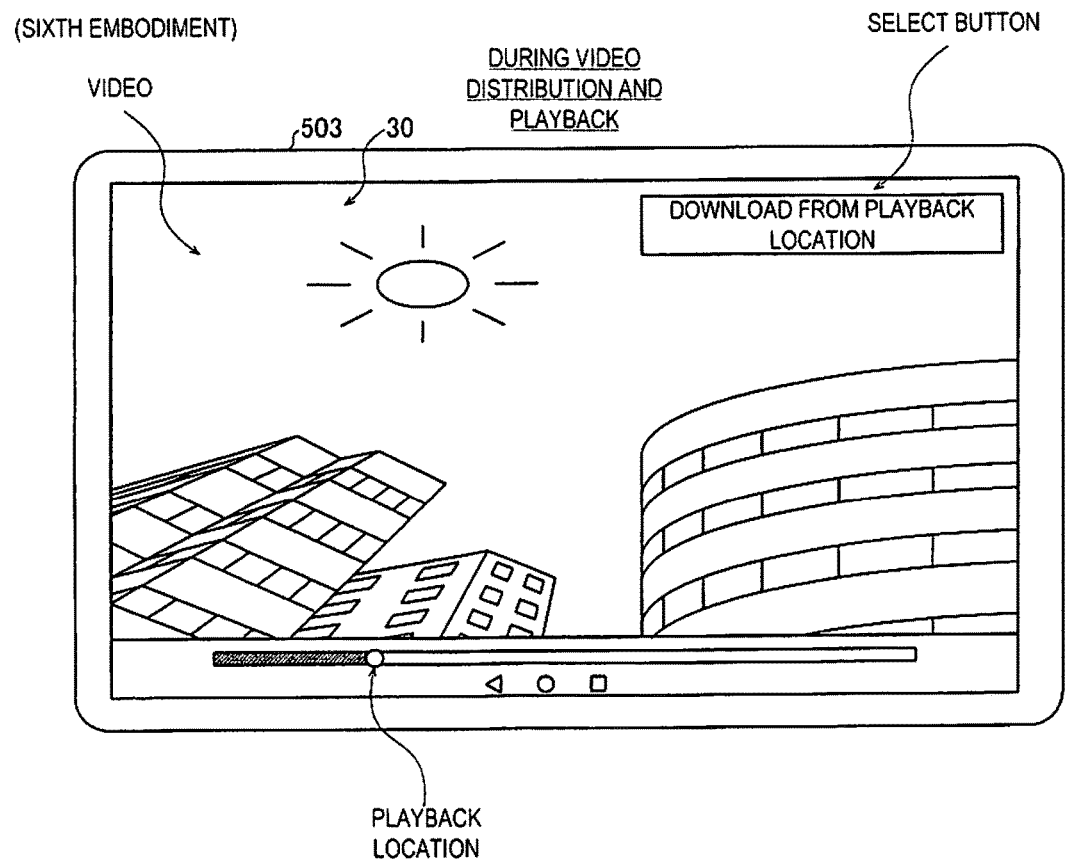
FIG. 16 is a diagram illustrating video division download processing from the playback location in the information device pertaining to a sixth embodiment.

More specifically, as shown in FIG. 16, the controller 534 is configured to perform video division download processing that is basically the same as the video division download processing in the second embodiment shown in FIG. 10. In particular, the controller 534 performs the video division download processing on the video data for a period after a designated playback location. This playback location is designated in response to the user operating the interface component 33 to press a "download from playback location" button that is displayed on the display component of the output component 30, as shown in FIG. 16, during video distribution and playback using a video distribution and playback function (see FIG. 4). In this case, in step S1 shown in FIG. 10, the origin of the byte range of the video data requested by the download request is set to the data volume (bytes) corresponding to the current playback location (the playback time during current viewing). For example, if the user presses the "download from playback location" button 20 minutes after start watching the video data, the controller 534 send the download request for a predetermined byte range (50 MB) of the video data from the data volume (bytes) corresponding to the playback time of 20 minutes. This download request is sent to the distribution device 1. With this configuration, a plurality sets of the divided video data corresponding to the video data for a period after the designated playback location (the current playback location) can be sequentially downloaded.

The rest of the configuration of the sixth embodiment is the same as in the second embodiment above.

Effect of Sixth Embodiment

The following effect is obtained with the sixth embodiment.

In the sixth embodiment, as discussed above, the controller 534 is configured to download the plurality of sets of the divided video data corresponding to the video data for a period after the designated playback location and configured to to perform the processing for playing the video data on the downloaded divided video data. Consequently, even when the user desires to download the video data from a desired playback location, the video data can be downloaded in a state of having been divided up into the plurality of sets of the divided video data. Furthermore, the controller 534 downloads the divided video data corresponding to the video data for the period after the designated playback location in response to the user input or operation during playing the video data at the designated playback location (current playback location). The rest of the effect of the sixth embodiment is the same as in the second embodiment above.

Seventh Embodiment

A seventh embodiment will now be described through reference to FIGS. 1, 2, 4, and 17 to 22. In this seventh embodiment, conversion download is performed, in which video data is downloaded (distributed) while the format of the video data is converted, unlike in the first to sixth embodiments above.

Configuration of Distribution System

As shown in FIG. 1, the distribution system 700 pertaining to the seventh embodiment differs from the distribution system 100 in the first embodiment in that it comprises a distribution device 601 and an information device 603. As shown in FIG. 2, the information device 603 differs from the information device 3 in the first embodiment in that it comprises a controller 634 and a video playback application 636. Those components that are the same as in the first embodiment will be numbered the same and will not be described again.

Configuration of Distribution Device

The distribution device 601 is a device that distributes the video data. More specifically, the distribution device 601 is a video recording device that records digital television broadcasts, and distributes recorded broadcast programs and broadcast programs that are being viewed, as the video data. The distribution device 601 serves as a recording device, and records the video data in an uncompressed format, such as DR (direct recording) format, or in a compressed format, such as AVC (advanced video coding) format. Also, the distribution device 601 produces converted data by converting the format of the video data, and distributes the converted data while producing the converted data. Specifically, in the illustrated embodiment, the distribution device 601 produces the converted data in the AVC format by converting the original video data in the DR format into the AVC format.

Figures 17, 18:
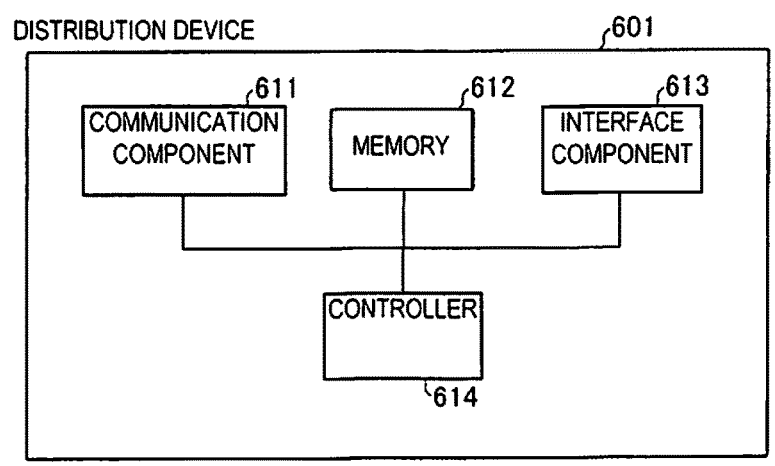
FIG. 17 is a block diagram of the overall configuration of the distribution device pertaining to the seventh embodiment.
FIG. 18 is a diagram illustrating a download request in the seventh embodiment.

As shown in FIG. 17, the distribution device 601 comprises a communication component 611, a memory 612, an interface component 613, and a controller 614.

The communication component 611 is configured to communicate wirelessly based on a specific standard (such as the IEEE 802.11 standard, for example). The communication component 611 is also configured to communicate wirelessly with the distribution device 603 via the access point 2. The communication component 611 is formed by a conventional communication device or circuit well known in the art. Thus, detailed description of the communication component 611 will be omitted.

The memory 612 includes a hard disk drive. Of course, the memory 612 can be other type of recording medium as needed and/or desired. The memory 612 is configured to store data. For example, the broadcast programs are stored (recorded) as the video data in the memory 612. Upon storing the video data, the video data is stored in the memory 612 in the DR format or in the AVC format according to the recording settings of the distribution device 601. The memory 612 can include a conventional memory, which is well known in the art, as needed and/or desired. For example, the memory 612 can include a ROM (Read Only Memory) device or flash memory and a RAM (Random Access Memory) device. The RAM can store statuses of operational flags and various data, such as detection results. The ROM can store control programs for various operations of the controller 614.

The interface component 613 includes one or more interface buttons, a remote control, or the like. The interface component 613 is configured to receive user input. Thus, the distribution device 601 is configured to perform operations in response to the user input. The user, for example, can use the interface component 613 to change the recording settings in the distribution device 601.

The controller 614 is configured to control the operation of the entire distribution device 601. The controller 614 includes a CPU (central processing unit), or other processers (microcomputers). The controller 614 can also include other conventional components such as an input interface circuit, an output interface circuit, and storage devices such as an internal ROM device and an internal RAM device. The controller 614 is programmed to control the various component of the distribution device 601. It will be apparent to those skilled in the art from this disclosure that the precise structure and algorithms for controller 614 can be any combination of hardware and software that will carry out the functions of the present invention.

Configuration of Information Device

The controller 634 (video playback application 636) of the information device 603 is configured to send a download request upon downloading the video data.

FIG. 18 illustrates a download request information that is sent from the information device 603 to the distribution device 601 in the event of the download request. This download request information includes "URI" (Uniform Resource Indicator) (first row of the character string information), "Host" (second row of the character string information), "Range bytes" (third row of the character string information), and "Use" (fourth row of the character string information).

"URI" is information for designating the video data to be downloaded out of the video data that is stored in the memory 612. Also, "URI" is information for designating the method for downloading the video data. Specifically, this information indicates whether to download the video data while converting the recording format (conversion download), or to download the video data without converting the recording format (non-conversion download). In other words, "URI" is information for designating whether to download the video data while converting the recording format of the video data from the DR format to the AVC format, or to download the video data as it is in the AVC format (or in the DR format). When the download of the video data is performed while converting the recording format, the character string surrounded by the dotted line in FIG. 18 is added to the "URI," for example. On the other hand, if the download is performed without converting the recording format, the character string surrounded by the dotted line in FIG. 18 is not added to the "URI."

"Host" is information for designating the IP address of the device distributing the video data (that is, the distribution device 601).

"Range bytes" is information for designating the byte location (byte range) of the video data to be downloaded. In FIG. 18, 0 bytes (the beginning of the video data) is designated as the byte location of the start of the download.

"Use" is information for designating whether to use a video distribution and playback function (see FIG. 4) or a video download function (see FIG. 4). When the use of the video download function is designated, it is designated by the character string "Download." When the use of the video distribution and playback function is designated, it is designated by the character string "Play." In FIG. 18, the use of the video download function has been designated by the character string "Download."

In the seventh embodiment, the OS 635 is configured to interrupt the download if the data transfer rate drops below a specific threshold during the download of the video data while the application is running in the background. When the download is interrupted, the OS 635 is configured to hold any data that has been downloaded part way, without discarding it. Also, the OS 635 is configured to resume the download of the video data from the byte location at the time of the download interruption (hereinafter also referred to as the "interruption location") after a specific amount of time (such as a few dozen minutes) has elapsed.

When the download is resumed by the OS 635, the controller 634 (video playback application 636) is configured to send the download request by designating the interruption location. Specifically, the controller 634 (video playback application 636) is configured to send the download request from the interruption location by designating the interruption location as the byte location at the start of the download by means of "Range bytes."

Configuration of Controller of Distribution Device Pertaining to Video Data Distribution Here, in the seventh embodiment, when the converted data is distributed to the information device 603, the controller 614 of the distribution device 601 is configured to produce the converted data based on the download request (conversion download request) received from the information device 603. Specifically, the controller 614 produces the converted data (the video data in the AVC recording format, for example) by converting the format of the video data from the DR recording format to the AVC recording format. Then, the controller 614 is configured to hold the converted data in the memory 612, and is configured to distribute the converted data to the information device 603.

In the illustrated embodiment, the controller 614 is configured to produce the converted data while sequentially storing in the memory 612 the data portion of the converted data whose production has been completed. Also, the controller 614 is configured to store the converted data in the memory 612 while sequentially distributing the data portion of the converted data whose storage has been completed. More specifically, the controller 614 is configured to sequentially store in the memory 612 a specific amount of the converted data at a time, and to sequentially distribute the stored specific amount of the converted data to the information device 603 every time the specific amount of the converted data is stored.

Also, in the seventh embodiment, the controller 614 is configured to produce the converted data and to store the converted data in the memory 612, not only during the distribution of the converted data to the information device 603, but also when the distribution of the converted data to the information device 603 is interrupted before the distribution of the converted data is complete. That is, the controller 614 is configured to continue producing the converted data and storing the converted data in the memory 612 even while the distribution of the converted data is interrupted.

Also, in the seventh embodiment, when the distribution of the converted data is complete, the controller 614 is configured to delete (discard) the converted data stored in the memory 612 based on the completion of the distribution of the converted data.

Conversion Download Processing

The conversion download processing pertaining to the seventh embodiment will now be described through reference to the sequence diagram in FIG. 19. In conversion download processing, the operation of the OS 635 and the video playback application 636 is executed by the controller 634. The operation of the distribution device 601 is executed by the controller 614.

Figure 19:
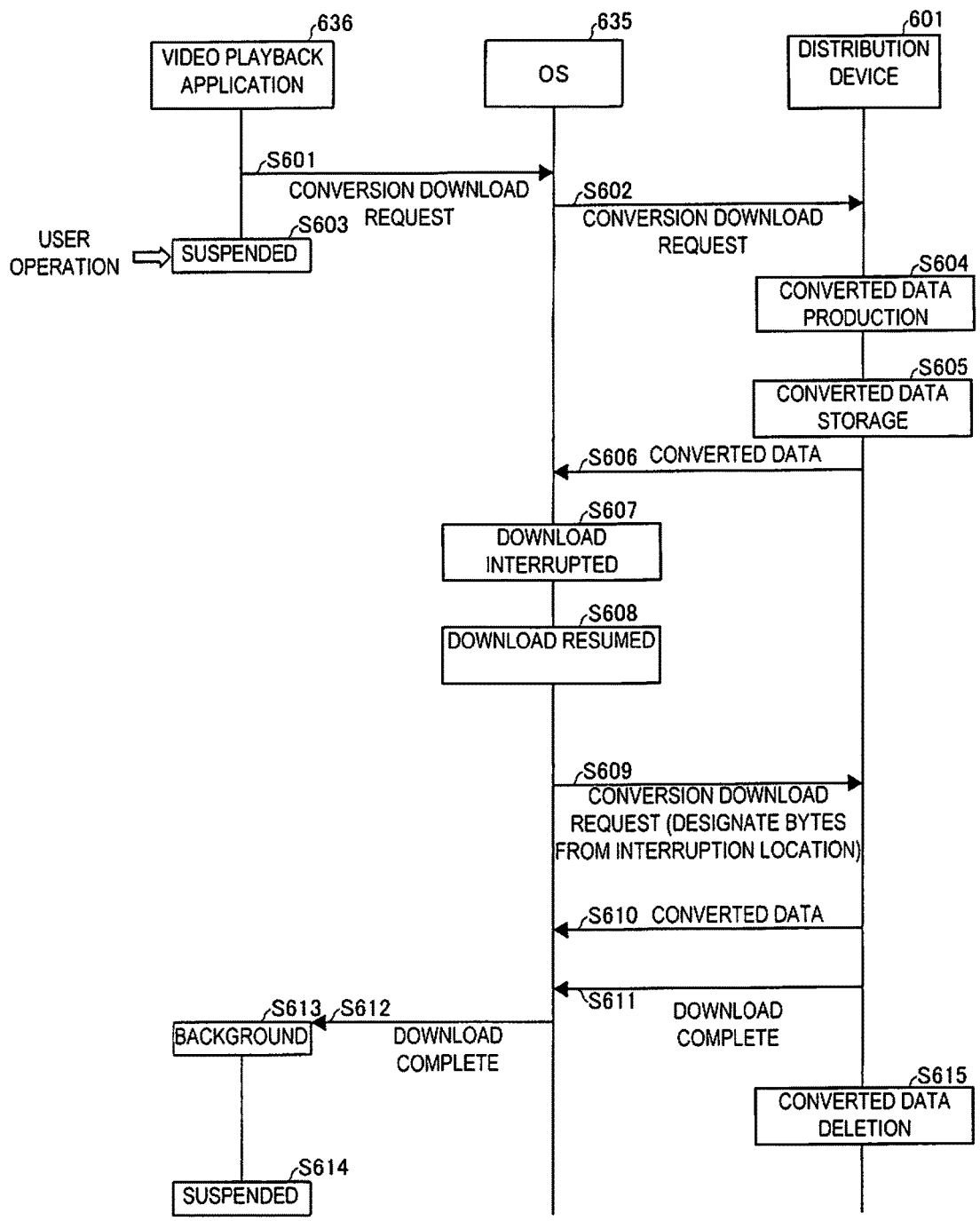
FIG. 19 is a sequence diagram illustrating conversion download processing in a distribution system pertaining to the seventh embodiment.

As shown in FIG. 19, in step S601, the conversion download request is sent from the video playback application 636 to the OS 635. That is, in step S601, a download request illustrated in FIG. 18 is sent, for example. In this download request, the conversion download is designated by "URI," 0 bytes (the beginning of the video data) is designated as the byte location at the start of the download by "Range bytes," and the use of the video download function is designated by "Use."

Then, in step S602, the conversion download request is sent from the OS 635 to the distribution device 601. Consequently, the download request (download request information) from the information device 603 is received by the distribution device 601.

Then, in step S603, the user operates the interface component 33 to move the video playback application 636 to "suspended." That is, in step S603, the video playback application is moved by the OS 635 from the foreground to the background.

Then, in step S604, the converted data is produced by the distribution device 601. Specifically, the controller 614 converts the video data in the DR recording format into the video data in the AVC recording format to produce the converted data.

Then, in step S605, the converted data thus produced is stored in the memory 612 of the distribution device 601.

Then, in step S606, the converted data stored in the memory 612 is distributed from the distribution device 601 to the information device 603. The processing of steps S604 to S606 is sequentially executed while the converted data is being distributed. Specifically, while the converted data is being produced, the data portion of the converted data whose production is complete is sequentially stored in the memory 612 by the distribution device 601. Also, while the converted data is being stored, the data portion of the converted data whose storage has been completed is sequentially distributed from the distribution device 601 to the information device 603. Specifically, the specific amount of the converted data (the data portion) is sequentially stored in the memory 612 at a time. Also, every time the specific amount of the converted data is stored, the specific amount of the converted data is distributed sequentially to the information device 603. The specific amount of the converted data can be a few dozen megabyte, such as 10 MB or 50 MB, but can be set to any amount as needed and/or desired.

The OS 635 of the information device 603 monitors the data transfer rate during the distribution of the converted data. If the OS 635 determines that the data transfer rate of the converted data is below a specific threshold, then in step S607, the OS 635 interrupts the download of the converted data.

Furthermore, if the OS 635 determines that a predetermined length of time has elapsed after the interruption of the download, then in step S608, the download of the converted data that is interrupted in step S607 is resumed.

Specifically, in step S609, another conversion download request is sent from the OS 635 to the distribution device 601. Specifically, in this conversion download request, the conversion download is designated by "URI," the interruption location (the byte location when the download is interrupted in S607) is designated by "Range bytes," and the use of the video download function is designated by "Use."

Then, in step S610, the distribution of the converted data is resumed. In particular, according to the conversion download request from the information device 603, the distribution device 601 distributes the converted data to the information device 603. In other words, the controller 614 distributes the converted from the location (interruption location) designated by the information device 603 according to the conversion download request.

After this, if all of the converted data is distributed, then in step S611, the distribution device 601 notifies the OS 635 that the download is complete.

Then, in step S612, the OS 635 notifies the video playback application 636 that the download is complete.

Then, in step S613, the OS 635 moves the video playback application 636 from "suspended" to "background."

Then, the video playback application 636 perform the processing for playing the video data (such as the processing to convert to the HLS format). In particular, the video playback application 636 converts the converted data into a playable format in the information device 603 (the HLS format). Then, in step S614, the OS 635 moves the video playback application 636 from "background" to "suspended."

In step S615, the stored converted data is deleted by the distribution device 601.

Distribution Device-Side Processing

Distribution device-side processing pertaining to the download of the video data will now be described through reference to the flowchart in FIG. 20. The operation of the distribution device 601 is executed by the controller 614.

Figure 20:
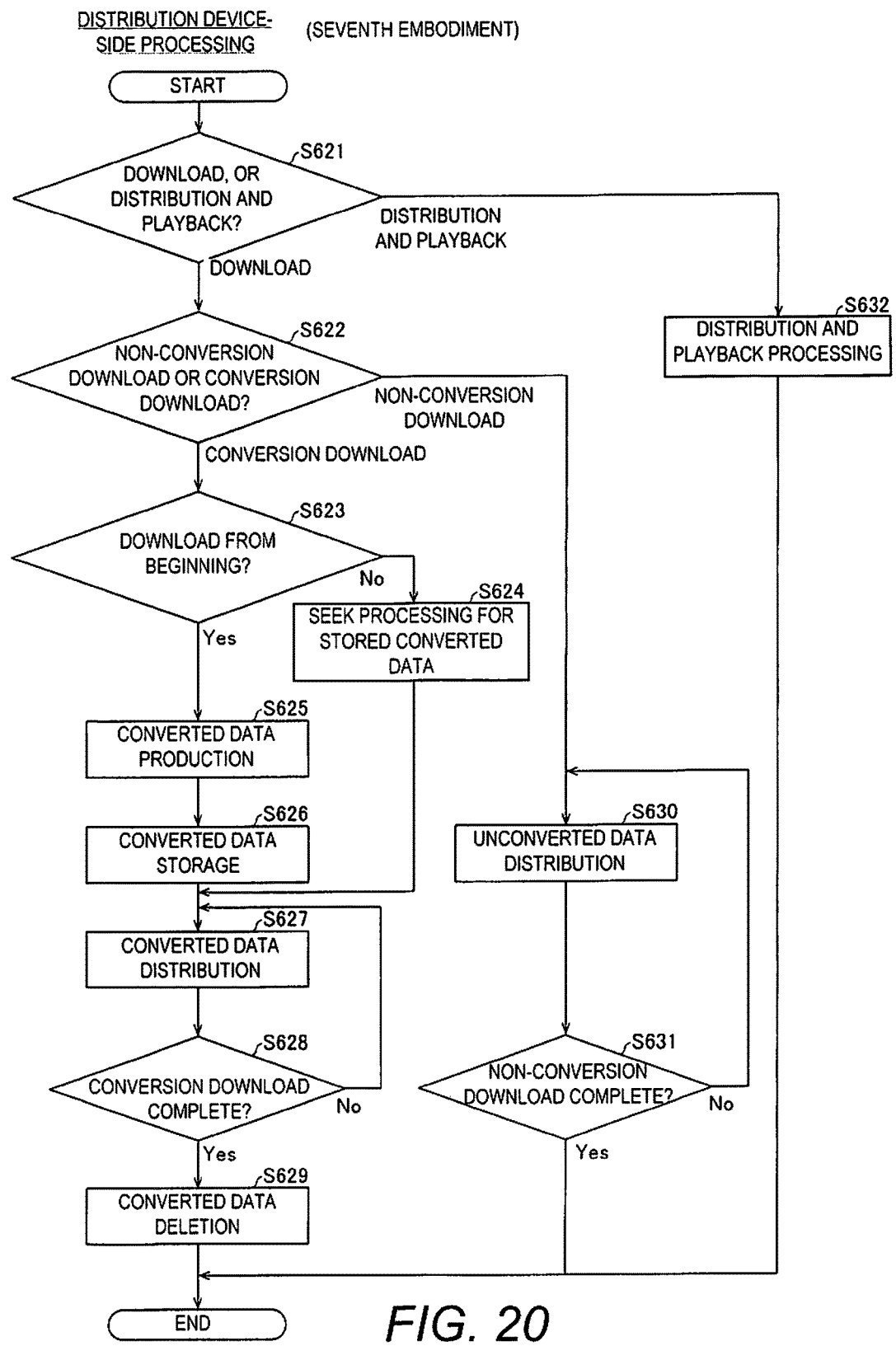
FIG. 20 is a flowchart illustrating distribution device-side processing of the distribution device pertaining to the seventh embodiment.

As shown in FIG. 20, in step S621, the controller 614 analyze the download request from the information device 603 in response to receiving the download request. Then, the controller 614 determines whether the use of the video download function is designated, or the use of the video distribution and playback function is designated based on the "Use" (see FIG. 18) of the download request from the information device 603. If "Download" is designated in "Use," then the controller 614 determines that the use of the video download function is designated, and the flow proceeds to step S622. If "Play" is designated in "Use," then the controller 614 determines that the use of the video distribution and playback function is designated, and the flow proceeds to step S632.

Then, in step S622, the controller 614 further determines whether the conversion download is designated, or the non-conversion download is designated based on the "URI" of the download request from the information device 603. If the controller 614 determines that the conversion download is designated, then the flow proceeds to step S623. If the controller 614 determines that the non-conversion download is designated, then the flow proceeds to step S630.

Then, in step S623, the controller 614 further determines whether or not the download is performed from the beginning of the video data based on the "Range bytes" of the download request from the information device 603. If 0 bytes has been designated as the byte location at the start of download in "Range bytes," then the controller 614 determines that the download is from the beginning of the video data, and the flow proceeds to step S625. If the interruption location has been designated in "Range bytes," then the controller 614 determines that the download is not from the beginning of the video data (the download is from the interruption location), and the flow proceeds to step S624.

In step S624, the seek processing is performed on the stored converted data. Specifically, a byte location in the stored converted data is designated based on the byte location (interruption location) designated by "Range bytes." The flow then proceeds to step S627.

Then, in step S625, the controller 614 produces the converted data.

Then, in step S626, the controller 614 stores the converted data thus produced in the memory 612.

Then, in step S627, the controller 614 distributes the converted data stored in the memory 612 from the distribution device 601 to the information device 603. If the flow does not go through step S624, then the converted data is distributed from the beginning. If the flow does go through step S624, then the converted data is distributed from the interruption location. That is, the distribution of the converted data is resumed from the interruption location.

The processing in steps S625 and S626 is sequentially executed while the converted data is being distributed. The processing in steps S625 and S626 is also sequentially executed while the download (distribution) is being interrupted.

Then, in step S628, the controller 614 determines whether or not the conversion download (the distribution of the converted data) is complete. If the controller 614 determines that the conversion download has not been completed, then the flow proceeds to step S627. The distribution of the converted data is then continued. Here, if the production and storage of the converted data have not been completed, the production and storage of the converted data are also continued. If the controller 614 determines that the conversion download is complete, then the flow proceeds to step S629.

Then, in step S629, the converted data stored in the memory 612 is deleted (discarded). After this, the distribution device-side processing is ended.

Also, in step S622, if the controller 614 determines that the non-conversion download has been designated, then the flow proceeds to step S630. Then, in step S630, the unconverted data is distributed from the distribution device 601 to the information device 603. Specifically, the video data (unconverted data) originally stored in the memory 612 in the AVC recording format (or the DR recording format) is distributed without converting the recording format.

Then, in step S631, the controller 614 determines whether or not the non-conversion download (the distribution of the unconverted data) is complete. If the controller 614 determines that the non-conversion download has not been completed, then the flow proceeds to step S630. The distribution of the unconverted data is then continued. If the controller 614 determines that the non-conversion download has been completed, the distribution device-side processing is ended.

Also, in step S621, if the controller 614 determines that the use of the video distribution and playback function has been designated, then the flow proceeds to step S632. Then, in step S632, the controller 614 performs the distribution and playback processing. Consequently, the information device 603 successively plays the video data while downloading the video data from the distribution device 601 (this is called streaming). Once the distribution and playback processing ends, the distribution device-side processing is ended.

Information Device-Side Processing

The information device-side processing pertaining to the conversion download of the video data will now be described through reference to the flowchart in FIG. 21. The operation of the information device 603 is executed by the controller 634.

Figure 21:
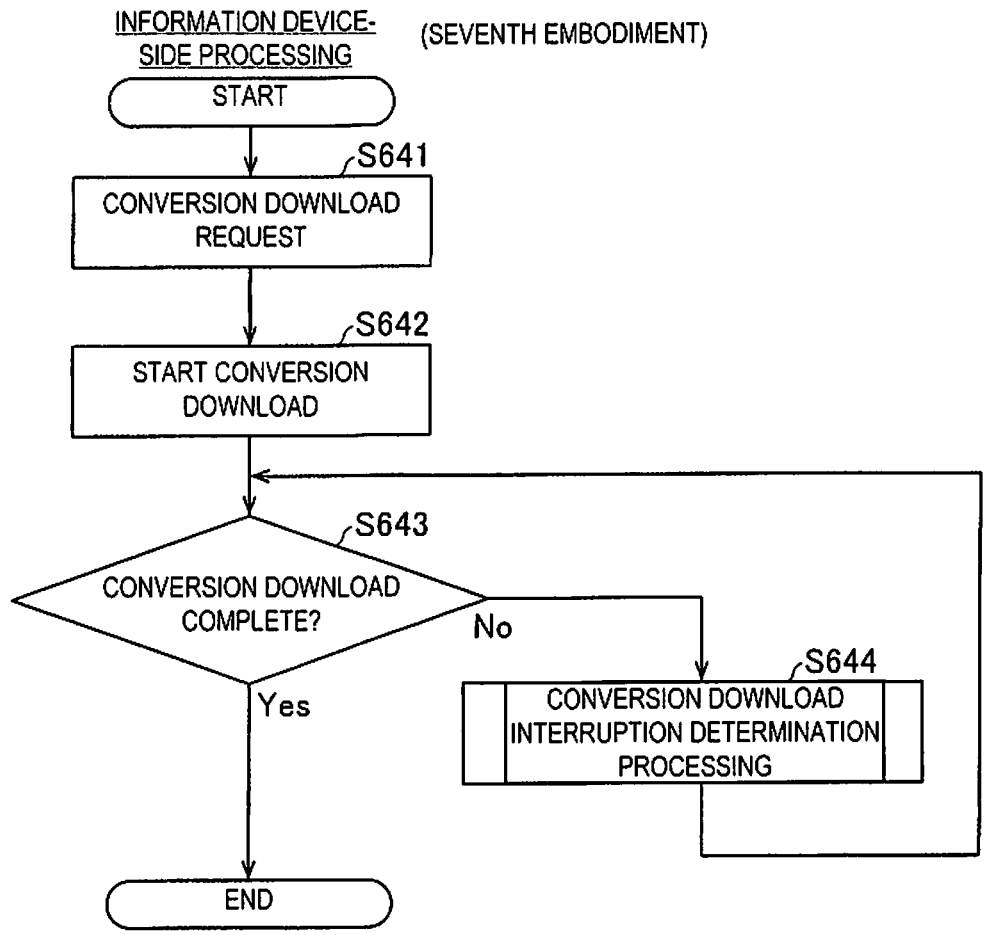
FIG. 21 is a flowchart illustrating information device-side processing of the information device pertaining to the seventh embodiment.

As shown in FIG. 21, in step S641, the conversion download request is performed. Specifically, in this conversion download request, as shown in FIG. 18, the conversion download is designated by "URI," 0 bytes is designated as the byte location at the start of the download by "Range bytes," and the use of the video download function is designated by "Use."

Then, in step S642, the controller 634 commences the conversion download.

Then, in step S643, the controller 634 determines whether or not the conversion download has been completed. If the controller 634 determines that the conversion download has been completed, then the information device-side processing is ended. If the controller 634 determines that the conversion download has not been completed, then the flow proceeds to step S644. Then, the conversion download interruption determination processing shown in FIG. 22 is carried out.

Figure 22:
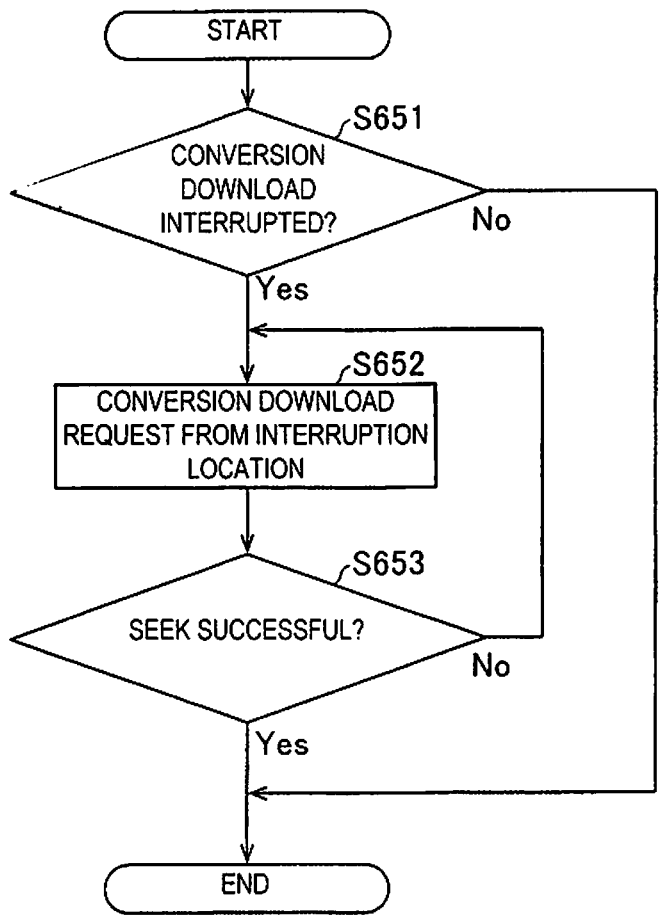
FIG. 22 is a flowchart illustrating download interrupt processing of the information device pertaining to the seventh embodiment.

As shown in FIG. 22, in the conversion download interruption determination processing, first, in step S651, the controller 634 determines whether or not the conversion download is interrupted. If the controller 634 determines that the conversion download has not been interrupted, then the conversion download interruption determination processing is ended without any processing at all having been performed, and the flow proceeds to step S643 shown in FIG. 21. If the controller 634 determines that the conversion download is interrupted, then the flow proceeds to step S652.

In step S652, the controller 634 determines that a predetermined length of time has elapsed after the conversion download is interrupted. Once the predetermined length of time has elapsed, then in step S652, the controller 634 send another conversion download request from the interruption location to the distribution device 601. Specifically, in this conversion download request, the conversion download is designated by "URI," the interruption location (the byte location at the point when the download is interrupted) is designated by "Range bytes," and the use of the video download function is designated by "Use."

Then, in step S653, the controller 634 determines whether or not the seek is successful. That is, the controller 634 determines whether or not the the conversion download request from the interruption location is successful. In other words, the controller 634 determines whether the conversion download is resumed and complete in response to the conversion download request. If the controller 634 determines that the seek is not successful, then the flow proceeds to step S652. Then, in step S652, the controller 634 sends another conversion request from the interruption location again. If the controller 634 determines that the seek is successful, then the conversion download interruption determination processing is ended, and the flow proceeds to step S643 shown in FIG. 21.

The rest of the configuration of the seventh embodiment is the same as in the first embodiment above.

Effect of Seventh Embodiment

The following effect is obtained with the seventh embodiment.

As discussed above, in the seventh embodiment, the controller 614 is configured to convert the video data to the converted data and store the converted data in the memory 612 in response to receiving the download request from the information device 603. The converted data is obtained by converting the format of the video data. The controller 614 is configured to distribute the converted data through the communication component 611 to the information device 603. Consequently, the converted data is stored in the distribution device 601. Thus, the information device 603 can perform the download by designating the byte location of the stored converted data. As a result, the information device 603 can resume the download from the interruption location. Therefore, there is no need to download the converted data again from the beginning even when the download of the converted data is interrupted. Consequently, when the converted data is distributed, the video data that has already been downloaded can be used in the information device 603 even if the download (distribution) of the video data (converted data) is interrupted.

Also, in the seventh embodiment, as discussed above, the controller 614 is configured to sequentially distribute the converted data to the information device 603 while storing the converted data in the memory 612. Consequently, the converted data can be sequentially distributed to the information device 603 substantially in parallel with the storage of the converted data in the memory 612. Thus, the converted data can be distributed quickly.

Also, in the seventh embodiment, as discussed above, the controller 614 is configured to sequentially distribute the specific amount of the stored converted data to the information device 603 every time the specific amount of the converted data is stored in the memory 612. Consequently, after the specific amount of converted data has been stored, the specific amount of the converted data is distributed right away. Thus, the converted data can be distributed more quickly.

Also, in the seventh embodiment, as discussed above, the controller 614 is configured to continue storing the converted data in the memory 612 while distribution of the converted data is interrupted. Consequently, the production and storage of the converted data that has not been distributed can be performed while the distribution of the converted data is being interrupted. As a result, when the download (distribution) is resumed, the converted data that has been stored in the memory can be distributed quickly.

Also, in the seventh embodiment, as discussed above, the controller 614 is configured to delete the converted data stored in the memory 612 in response to the distribution of the converted data being complete. Consequently, after the distribution of the converted data is complete, available data volume in the distribution device 601 is prevented from being reduced by the converted data that has already been distributed.

Modification Examples

The embodiments disclosed herein are examples in every respect, and should not be interpreted as being limiting in nature. The scope of the invention being indicated by the appended claims rather than by the above description of the embodiments, all modifications (modification examples) within the meaning and range of equivalency of the claims are included.

For example, various modes of the present invention are illustrated in the first to seventh embodiments above. However, but the present invention is not limited to or by the modes of the various embodiments. The present invention encompasses modes in which one or more of the configurations of the various embodiments are suitably combined with the configuration of another embodiment.

Also, in the first to seventh embodiments above, the video recording device is illustrated as an example of the distribution device, and the portable information device is illustrated as an example of the information device. However, the present invention is not limited to this. With the present invention, as long as the video data can be distributed, some device other than the video recording device (such as a server device) may be used as the distribution device. Also, as long as the video data can be downloaded, some information device other than the portable information device may be used.

Also, in the first to sixth embodiments above, 50 MB (megabytes) of the video data is when the download request for the divided video data is sent. However, the present invention is not limited to this. With the present invention, when the download request for the divided video data is sent, a data amount other than 50 MB may be requested.

Also, in the first to sixth embodiments above, either the HLS conversion processing or the seek playback table production processing is performed as the processing for playing the video data every time the divided video data is downloaded. However, the present invention is not limited to this. With the present invention, the processing for playing the video data need not be performed every time the divided video data is downloaded. For instance, the processing for playing the video data may be performed at the point when several sets of the divided video data have been accumulated, or at the point when the download is interrupted.

Also, in the first embodiment above, the HLS conversion processing is performed after completion of the download of the divided video data, while in the second to sixth embodiments, the seek playback table production processing is performed after completion of the download of the divided video data. However, the present invention is not limited to this. With the present invention, as long as the video data is played, some processing other than the HLS conversion processing or the seek playback table production processing may be performed. Also, in the third to sixth embodiments above, the HLS conversion processing may be performed rather than the seek playback table production processing.

Also, in the first embodiment above, the downloaded video data is converted to the HLS format, which is playable in the information device. However, the present invention is not limited to this. With the present invention, as long as the format is a playable in the information device, the video data may be converted to some format other than the HLS format.

Also, in the second to sixth embodiments above, the seek playback table is produced as the data for the seek playback in which the playback location in the video data is designated for playback. However, the present invention is not limited to this. With the present invention, data other than the seek playback table may be produced as the data for the seek playback in which the playback location in the video data is designated for playback.

Also, in the fifth embodiment above, the operation of the controller is illustrated in a case in which the download of the video data is interrupted before the download of the video data is complete, and the download of the video data is resumed from a data point before a data point at which the download of the video data is interrupted. In this case, the controller in the fifth embodiment is configured to delete only the overlapping data portion of the resume video data when the resume video data including the overlapping data portion is downloaded. The overlapping data portion of the resume video data is a data portion that at least partially overlaps with the incomplete video data that has been downloaded by the time the download is interrupted, out of all the video data. However, the present invention is not limited to this. With the present invention, in the same case mentioned above, the controller may be configured to selectively play a data portion of the resume video data other than the overlapping data portion when the resume video data including the overlapping data portion is downloaded. As mentioned above, the overlapping data portion of the resume video data is a data portion that at least partially overlaps with the incomplete video data that has been downloaded by the time the download is interrupted, out of all the video data.

Specifically, in step S22c shown in FIG. 14, the resume video data is stored in the memory 32, rather than deleting all of the resume video data. In playing the video data, the incomplete video data and the data portion of the resume video data other than the overlapping data portion of the resume video data are selectively played. With this configuration, when the video data is played, there will be fewer malfunctions due to the overlapping data portion of the resume video data that overlaps with the incomplete video data. Also, the data portion of the resume video data other than the overlapping data portion can be played.

Also, in the seventh embodiment above, an example is illustrated in which the download is interrupted by the OS 635. However, the present invention is not limited to this. The present invention can also be applied to a case in which the download is interrupted by communication error, such as communication error between the distribution device 601 and the information device 603.

Also, in the seventh embodiment above, the distribution device 601 stores the converted data while sequentially distributing the data portion of the converted data that has been stored in the memory 612. However, but the present invention is not limited to this. With the present invention, the distribution device 601 may distribute the converted data after the storage of all of the converted data is complete.

Also, in the seventh embodiment above, the distribution device 601 also performs the production and storage of the converted data while the distribution of the converted data is interrupted. However, the present invention is not limited to this. With the present invention, as long as the converted data is produced and stored up to at least the interruption location, the distribution device 601 need not perform the production and storage of the converted data while the distribution of the converted data is interrupted.

Also, in the seventh embodiment above, the stored converted data is deleted when the distribution of the converted data is complete. However, the present invention is not limited to this. With the present invention, the converted data that is stored in the memory 612 need not be deleted. In this case, the stored converted data may be utilized as the non-conversion download video data. For example, the stored converted data in the AVC recording format can be used as the non-conversion download video data in which the video data is downloaded without accompanying the format conversion.

Also, in the seventh embodiment above, the converted data is stored along with the video data in the memory 612 in which the video data is stored. However, the present invention is not limited to this. With the present invention, the memory 612 may be configured to include a first memory in which the video data is stored, and a second memory in which the converted data is stored.

[1] In view of the state of the known technology and in accordance with a first aspect of the present invention, an information device is provided that comprises a communication component and a controller. The communication component is configured to communicate with an external device. The controller is configured to download video data from the external device through the communication component. The controller is configured to perform processing for playing the video data. The controller is configured to execute an application for playing the downloaded video data. The controller is configured to send a download request for each divided video data, with the divided video data being obtained by dividing up the video data. Also, the controller can be configured to perform the processing for playing the video data on the divided video data that is downloaded in response to the download request, for example.

With the information device pertaining to the first aspect of this invention, as discussed above, the controller is provided that sends the download request for each set of the divided video data while the application is running in the background, for example. The divided video data is obtained by dividing up the video data. Consequently, the download of the video data can be completed for each set of divided video data. Thus, the divided video data that has been downloaded can be recognized by the OS as one set of data. As a result, even if the OS is configured to discard the video data that has been partially downloaded, and if the download of the video data is interrupted, then the divided video data that has already been downloaded can be prevented from being discarded by the OS. Thus, the downloaded video data (i.e., the downloaded divided video data) can be used. Also, the controller is configured to perform the processing for playing the video data on the divided video data that has been downloaded in response to the download request. Consequently, the downloaded divided video data can be put in a playable state. As a result of all this, even if the download of video data is interrupted, downloaded video data (divided video data) can be put in a playable state.

[2] In accordance with a preferred embodiment according to the information device mentioned above, the controller is configured to repeat sending the download request for the divided video data until download of the video data is complete.

[3] In accordance with a preferred embodiment according to any one of the information devices mentioned above, the controller is configured to perform, as the processing for playing the video data, processing to convert a format of the video data into a playable format, or processing to produce playback data in which playback time of the video data is associated with data volume of the video data. With this configuration, if the processing is performed to convert the format of the video data into the playable format, then the downloaded video data (the divided video data) can be played quickly. Also, if the processing is performed to produce the playback data, then a seek playback can be performed even when playback is performed while converting the format of the video data into the playable format.

[4] In accordance with a preferred embodiment according to any one of the information devices mentioned above, the controller is configured to perform the processing to convert the format of the video data into the playable format, or the processing to produce the playback data every time the divided video data is downloaded. With this configuration, the processing to convert the format of the video data into the playable format or the processing to produce the playback data can be performed at mutually different timing for each set of the divided video data. Thus, the processing load on the controller can be spread out.

[5] In accordance with a preferred embodiment according to any one of the information devices mentioned above, the controller is configured to perform, as the processing to convert the format of the video data into the playable format, processing to produce a plurality of divided files and a playlist file based on the divided video data.

[6] In accordance with a preferred embodiment according to any one of the information devices mentioned above, the controller is configured to update the playlist file produced based on a first set of the divided video data when a second set of the divided video data is downloaded.

[7] In accordance with a preferred embodiment according to any one of the information devices mentioned above, the controller is configured to repeat producing the divided files and updating the playlist file until download of the video data is complete.

[8] In accordance with a preferred embodiment according to any one of the information devices mentioned above, the controller is configured to update the playback data produced based on a first set of the divided video data when a second set of the divided video data is downloaded.

[9] In accordance with a preferred embodiment according to any one of the information devices mentioned above, the controller is configured to produce the playback data and merge the divided video data.

[10] In accordance with a preferred embodiment according to any one of the information devices mentioned above, the controller is configured to repeat updating the playback data and merging the divided video data until download of the video data is complete.

[11] In accordance with a preferred embodiment according to any one of the information devices mentioned above, when download of the video data is interrupted, the controller is configured to correct playback time of the video data to correspond to playback time of incomplete video data that has been downloaded by the time the download is interrupted. With this configuration, when the incomplete video data is played, the user can be notified of the playback time of the incomplete video data, rather than the playback time of the original video data. As a result, the user can be accurately notified of up to what playback time of data out of all the video data is downloaded as the incomplete video data.

[12] In accordance with a preferred embodiment according to any one of the information devices mentioned above, the controller is configured to display the corrected playback time on a display component when the playback time of the video data is corrected.

[13] In accordance with a preferred embodiment according to any one of the information devices mentioned above, when download of the video data is resumed and overlapping video data is downloaded that includes an overlapping data portion that partially overlaps incomplete video data that has been downloaded by the time the download is interrupted, the controller is configured to delete the overlapping video data. With this configuration, when the video data is played, malfunction caused by the overlapping data portion in which the incomplete video data overlaps the overlapping video data can be reliably suppressed.

[14] In accordance with a preferred embodiment according to any one of the information devices mentioned above, when download of the video data is resumed and overlapping video data is downloaded that includes an overlapping data portion that partially overlaps incomplete video data that has been downloaded by the time the download is interrupted, the controller is configured to delete the overlapping data portion of the overlapping video data. With this configuration, malfunction caused by the overlapping data portion in which the incomplete video data overlaps the overlapping video data can be suppressed when the video data is played. Also, a data portion other than the overlapping data portion overlapping the overlapping video data can be made in a playable state.

[15] In accordance with a preferred embodiment according to any one of the information devices mentioned above, when download of the video data is resumed and overlapping video data is downloaded that includes an overlapping data portion that partially overlaps incomplete video data that has been downloaded by the time the download is interrupted, the controller is configured to selectively play a data portion of the overlapping video data other than the overlapping data portion. With this configuration, malfunction caused by the overlapping data portion in which the incomplete video data overlaps the overlapping video data can be suppressed when the video data is played. Also, a data portion other than the overlapping data portion overlapping the overlapping video data can be played.

[16] In accordance with a preferred embodiment according to any one of the information devices mentioned above, the controller is configured to download the divided video data corresponding to the video data for a period after a designated playback location and configured to perform the processing for playing the video data on the downloaded divided video data. With this configuration, the video data can be downloaded in a state of having been divided up into the divided video data even if the video data is downloaded from the playback location desired by the user.

[17] In accordance with a preferred embodiment according to any one of the information devices mentioned above, the controller is configured to download the divided video data corresponding to the video data for the period after the designated playback location in response to an input during playing the video data at the designated playback location.

[18] In view of the state of the known technology and in accordance with a second aspect of the present invention, a distribution device is provided that comprises a communication component, a memory, and a controller. The communication component is configured to communicate with an external device. The memory is configured to store video data. The controller is configured to convert the video data to converted data and store the converted data in the memory in response to receiving a download request from the external device. The controller is configured to distribute the converted data through the communication component to the external device.

With the distribution device pertaining to the second aspect of this invention, the controller is configured to store in the memory the converted data that is produced by converting the format of the video data in response to receiving the download request from the external device, such as an information device. The controller is configured to distribute the converted data through the communication component to the external device. Consequently, since the converted data is stored in the distribution device, the external device can perform the download by designating the byte location of the stored converted data. As a result, the external device can resume the download from the interruption location. Thus, there is no need to redo the download of the converted data from the beginning. Consequently, the downloaded video data can be used in the external device even if the converted data is distributed and the download (distribution) of the video data (converted data) is interrupted.

[19] In accordance with a preferred embodiment according to the distribution device mentioned above, the controller is configured to sequentially distribute the converted data to the external device while storing the converted data in the memory. With this configuration, since storage of the converted data is carried out in parallel with sequential distribution of the converted data to the external device, the converted data can be distributed quickly.

[20] In accordance with a preferred embodiment according to any one of the distribution devices mentioned above, the controller is configured to sequentially distribute a specific amount of the converted data to the external device every time the specific amount of the converted data is stored in the memory. With this configuration, since the specific amount of the converted data is distributed immediately after the storage of the specific amount of the converted data, the converted data can be distributed more quickly.

[21] In accordance with a preferred embodiment according to any one of the distribution devices mentioned above, with the configuration in which the converted data is distributed sequentially to the external device while being stored in the memory, the controller is configured to continue storing the converted data in the memory while distribution of the converted data is interrupted. With this configuration, undistributed converted data can be stored while distribution of the converted data is interrupted. As a result, when the download (distribution) is resumed, the converted data that has been stored can be quickly distributed.

[22] In accordance with a preferred embodiment according to any one of the distribution devices mentioned above, the controller is configured to distribute the converted data from a location designated by the external device.

[23] In accordance with a preferred embodiment according to any one of the distribution devices mentioned above, the controller is configured to delete the converted data stored in the memory in response to distribution of the converted data being complete.

[24] With this configuration, when the distribution of the converted data is complete, the storage capacity of the distribution device can be prevented from reducing due to the distributed converted data.

With the present invention, as discussed above, there are provided an information device and a distribution device with which downloaded video data can be used even when download of video data has been interrupted.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having"

and their derivatives. Also, the terms "part," "section," "portion," "member" or "element" when used in the singular can have the dual meaning of a single part or a plurality of parts unless otherwise stated.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An information device comprising:
   a communication component that communicates with an external device; and
   a controller that downloads video data from the external device through the communication component, performs processing to convert a format of the video data into a playable format and executes an application for playing the video data,
   the controller sending a download request for each divided video data to sequentially download the divided video data, with the divided video data being obtained by dividing up the video data,
   the processing by the controller to convert the format of the video data into the playable format including dividing the divided video data into a plurality of divided files and producing a playlist file for a playback instruction of the divided files every time the divided video data is downloaded.

2. The information device according to claim 1, wherein the controller sends a plurality of download requests sequentially specifying contiguous data regions of a data file of the video data at a predetermined data interval to download each of the contiguous data regions of the data file of the video data as the divided video data.

3. The information device according to claim 2, wherein the controller repeats sending the download requests for the divided video data until download of the video data is complete.

4. The information device according to claim 1, wherein the controller updates the playlist file produced based on a first set of the divided video data when a second set of the divided video data is downloaded.

5. The information device according to claim 1, wherein the controller repeats producing the divided files and updating the playlist file until download of the video data is, complete.

6. The information device according to claim 2, wherein when download of the video data is interrupted, the controller corrects playback time of the video data to correspond to playback time of incomplete video data that has been downloaded by the time the download is interrupted.

7. The information device according to claim 6, wherein. the controller displays the corrected playback time on a display component when the playback time of the video data is corrected.

8. The information device according to claim 2, wherein when download of the video data is resumed and overlapping video data is downloaded that includes an overlapping data portion that partially overlaps incomplete video data that has been downloaded by the time the download is interrupted, the controller deletes the overlapping video data.

9. The information device according to claim 2, wherein when download of the video data is resumed and overlapping video data is downloaded that includes an overlapping data portion that partially overlaps incomplete video data that has been downloaded by the time the download is interrupted, the controller deletes the overlapping data portion of the overlapping video data.

10. The information device according to claim 2, wherein when download of the video data is resumed and overlapping video data is downloaded that includes an overlapping data portion that partially overlaps incomplete video data that has been downloaded by the time the download is interrupted, the controller selectively plays a data portion of the overlapping video data other than the overlapping data portion.

11. The information device according to claim 2, wherein the controller downloads the divided video data corresponding to the video data for a period after a designated playback location and performs the processing for playing the video data on the downloaded divided video data.

12. The information device according to claim 11, wherein
   the controller downloads the divided video data corresponding to the video data for the period after the designated playback location in response to an input during playing the video data at the designated playback location.

13. The information device according to claim 2, wherein the controller sends a next subsequent one of the download requests after the download is completed for the prior one of the contiguous data regions of the data file of the video data.

* * * * *